US010929605B1

(12) United States Patent
Rosner et al.

(10) Patent No.: US 10,929,605 B1
(45) **Date of Patent: *Feb. 23, 2021**

(54) METHODS AND APPARATUS FOR SENTIMENT ANALYSIS

(71) Applicant: NetBase Solutions, Inc., Santa Clara, CA (US)

(72) Inventors: Lisa Joy Rosner, Emerald Hills, CA (US); Jens Erik Tellefsen, Los Altos, CA (US); Michael Jacob Osofsky, Palo Alto, CA (US); Jonathan Spier, Menlo Park, CA (US); Ranjeet Singh Bhatia, Sunnyvale, CA (US); Malcolm Arthur De Leo, Pleasanton, CA (US); Karl Long, Lyndhurst (GB)

(73) Assignee: NetBase Solutions, Inc., Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/613,324

(22) Filed: Feb. 3, 2015

Related U.S. Application Data

(63) Continuation of application No. 13/471,417, filed on May 14, 2012, now Pat. No. 8,949,263.

(51) Int. Cl.
*G06F 17/00* (2006.01)
*G06F 40/30* (2020.01)
(Continued)

(52) U.S. Cl.
CPC .............. *G06F 40/30* (2020.01); *G06F 16/35* (2019.01); *G06F 40/10* (2020.01)

(58) Field of Classification Search
CPC ........... G06F 17/30386; G06F 17/3053; G06F 17/30864; G06F 17/30595; G06F 17/30598
See application file for complete search history.

(56) References Cited

U.S. PATENT DOCUMENTS 5,694,523 A 12/1997 Wical
5,940,821 A 8/1999 Wical
(Continued)

OTHER PUBLICATIONS

Gautam et al., published Feb. 17, 2008 (y/m/d), pp. 2040-2042. “Document Retrieval Based on Key Information of Sentence,” IEEE ICACT.
(Continued)

*Primary Examiner* — Truong V Vo
(74) *Attorney, Agent, or Firm* — Kaplan IP Law, PLLC; Jonathan T. Kaplan

(57) ABSTRACT

Analysis is enabled, of a corpus of statements (such as those from social media), according to each statement’s expression of sentiment about some kind of object. Object-specific corpuses are identified, where each object-specific corpus contains statements that refer to a same object. For each statement of an object-specific corpus, the polarity and intensity of sentiment expressed is determined. Net polarity and intensity measures are determined for each object-specific corpus and utilized to graph the corpus in a two-dimensional space. The area of the graphical symbol, representative of an object-specific corpus, can be proportional to the number (absolute or relative) of statements of the object-specific corpus. Brands can be compared, with each brand represented by an object-specific corpus. A single brand can have shown, relative to a temporal dimension, the net polarity, net intensity, or volume of its statements. Net polarity is shown to have a strong correlation with survey-based techniques.

33 Claims, 20 Drawing Sheets

(51) Int. Cl.
*G06F 16/35* (2019.01)
*G06F 40/10* (2020.01)

(56) References Cited

U.S. PATENT DOCUMENTS

| | | | |
|---|---|---|---|
| 5,963,940 | A | 10/1999 | Liddy et al. |
| 5,995,922 | A | 11/1999 | Penteroudakis et al. |
| 6,012,053 | A | 1/2000 | Pant et al. |
| 6,202,064 | B1 | 3/2001 | Julliard |
| 6,269,356 | B1 | 7/2001 | Hatton |
| 6,278,967 | B1 | 8/2001 | Akers et al. |
| 6,453,312 | B1 | 9/2002 | Goiffon et al. |
| 6,560,590 | B1 | 5/2003 | Shwe et al. |
| 6,571,240 | B1 | 5/2003 | Ho |
| 6,578,022 | B1 | 6/2003 | Foulger et al. |
| 6,584,464 | B1 | 6/2003 | Warthen |
| 6,671,723 | B2 | 12/2003 | Nguyen et al. |
| 6,675,159 | B1 | 1/2004 | Lin et al. |
| 6,738,765 | B1 | 5/2004 | Wakefield et al. |
| 6,862,713 | B1 | 3/2005 | Kraft et al. |
| 6,965,857 | B1 | 11/2005 | Decary |
| 7,356,540 | B2 | 4/2008 | Smith et al. |
| 7,496,593 | B2 | 2/2009 | Gardner et al. |
| 7,779,007 | B2 | 8/2010 | West et al. |
| 7,805,302 | B2 | 9/2010 | Chelba et al. |
| 7,890,514 | B1 | 2/2011 | Mohan et al. |
| 8,046,348 | B1 | 10/2011 | Rehling et al. |
| 8,055,608 | B1 | 11/2011 | Rehling et al. |
| 8,131,540 | B2 | 3/2012 | Marchisio et al. |
| 8,935,152 | B1 | 1/2015 | Li et al. |
| 9,047,285 | B1 | 6/2015 | Li et al. |
| 2002/0065857 | A1 | 5/2002 | Michalewicz et al. |
| 2002/0091671 | A1 | 7/2002 | Prokoph |
| 2003/0093421 | A1 | 5/2003 | Kimbrough et al. |
| 2003/0172061 | A1 | 9/2003 | Krupin et al. |
| 2004/0044952 | A1 | 3/2004 | Jiang et al. |
| 2004/0078190 | A1 | 4/2004 | Fass et al. |
| 2004/0150644 | A1 | 8/2004 | Kincaid |
| 2005/0149494 | A1 | 7/2005 | Lindh et al. |
| 2005/0165600 | A1 | 7/2005 | Kasravi et al. |
| 2007/0156677 | A1 | 7/2007 | Szabo |
| 2007/0294784 | A1 | 12/2007 | West et al. |
| 2009/0112892 | A1 | 4/2009 | Cardie et al. |
| 2009/0306967 | A1* | 12/2009 | Nicolov .............. G06F 17/2785 704/9 |
| 2010/0332511 | A1* | 12/2010 | Stockton ........... G06F 17/30616 707/759 |
| 2011/0161071 | A1 | 6/2011 | Duong-van |
| 2013/0018651 | A1 | 1/2013 | Djordjevic et al. |

OTHER PUBLICATIONS

Ku et al., published Mar. 27, 2006 (y-m-d), 8 pgs. "Opinion Extraction, Summarization and Tracking in News and Blog Corpora," AAAI Spring Symposium Series 2006.
Ruppenhofer et al., published Aug. 25, 2006 (y/m/d), 166 pages. "FrameNet II: Extended Theory and Practice," International Computer Science Institute, University of California at Berkeley, USA.
Schwing, Kyle M., published Sep. 1, 2009 (y/m/d), "The Flux Measure of Influence in Engineering Networks," Master's Thesis, Dept. of ME, MIT.
Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.
Zadrozny, Slawomir et al., published 2003, 5 pgs. "Linguistically quantified thresholding strategies for text categorization," Systems Research Institute, Polish Academy of Sciences, Warszawa, Poland.
Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.
Sheard, Tim, published 2009, "Graphs in Computer Science," Portland State University, 12 pgs.
Lucene Support p. 2454, with comments dated May 10, 2010-Jul. 16, 2010; https://issues.apache.org/jira/browse/LUCENE-2454; retrieved Jul. 24, 2019 (y/m/d); 9 pages.
Lucene Slide Share Presentation, dated May 7, 2010; https://www.slideshare.net/MarkHarwood/proposal-for-nested-document-support-in-lucene; retrieved Jul. 24, 2019 (y/m/d); 15 pages.
readme.txt in LuceneNestedDocumentSupport.zip, creation date May 10, 2010; retrieved Jul. 25, 2019 (y/m/d); 2 pages.
NestedDocumentQuery.java in LuceneNestedDocumentSupport.zip, creation date Aug. 25, 2010; retrieved Jul. 25, 2019 (y/m/d); 8 pages.
PerParentLimitedQuery.java in LuceneNestedDocumentSupport.zip, creation date Sep. 8, 2010; retrieved Jul. 25, 2019 (y/m/d); 10 pages.

* cited by examiner

Quandrants Based on Middle of Scales

An Example Polarity-Intensity Sentiment Graph of Object-Specific Corpus P1

Example COS1 (A Collection of Object-Specific Corpuses)

Quadrants Based on Medians, for COS1

Quadrants Based on Medians, for COS1

Relative Quandrants for P1, P2

Close Up of Relative Quandrants

Rolling "Pipe" of 4 time periods: t1-t4

Rolling "Pipe" of 4 time periods: t2-t5

EXAMPLE PRODUCTION ENVIRONMENT

QUERY SCREEN

RESULT SCREEN (FICTITIOUS CONTENT)

METHODS AND APPARATUS FOR SENTIMENT ANALYSIS

As provided for under 35 U.S.C. §120, this patent claims benefit of the filing date of the following U.S. patent application, herein incorporated by reference in its entirety:

"Methods and Apparatuses for Sentiment Analysis," filed 2012 May 14 (y/m/d), having inventors Lisa Joy Rosner, Jens Erik Tellefsen, Michael Jacob Osofsky, Jonathan Spier, Ranjeet Singh Bhatia, Malcolm Arthur De Leo, and Karl Long, and application Ser. No. 13/471,417.

CROSS REFERENCE TO RELATED APPLICATIONS

This application is related to the following U.S. patent application(s), which are herein incorporated by reference in their entirety:

"Methods and Apparatuses for Clustered Storage of Information and Query Formulation," filed 2011 Oct. 24 (y/m/d), having inventors Mark Edward Bowles, Jens Erik Tellefsen, and Ranjeet Singh Bhatia and application Ser. No. 13/280,294 ("the '294 application");

"Method and Apparatus for Frame-Based Search," filed 2008 Jul. 21 (y/m/d), having inventors Wei Li, Michael Jacob Osofsky and Lokesh Pooranmal Bajaj and application Ser. No. 12/177,122 ("the '122 application");

"Method and Apparatus for Frame-Based Analysis of Search Results," filed 2008 Jul. 21 (y/m/d), having inventors Wei Li, Michael Jacob Osofsky and Lokesh Pooranmal Bajaj and application Ser. No. 12/177,127 ("the '127 application");

"Method and Apparatus for Determining Search Result Demographics," filed 2010 Apr. 22 (y/m/d), having inventors Michael Jacob Osofsky, Jens Erik Tellefsen and Wei Li and application Ser. No. 12/765,848 ("the '848 application");

"Method and Apparatus for HealthCare Search," filed 2010 May 30 (y/m/d), having inventors Jens Erik Tellefsen, Michael Jacob Osofsky, and Wei Li and application Ser. No. 12/790,837 ("the '837 application"); and "Method and Apparatus for Automated Generation of Entity Profiles Using Frames," filed 2010 Jul. 20 (y/m/d), having inventors Wei Li, Michael Jacob Osofsky and Lokesh Pooranmal Bajaj and application Ser. No. 12/839,819 ("the '819 application").

Collectively, the above-listed related applications can be referred to herein as "the Related Applications."

FIELD OF THE INVENTION

The present invention relates generally to the analysis of sentiment, and more particularly to analysis across various types of corpuses of statements.

BACKGROUND OF THE INVENTION

It is well known that tracking customer satisfaction is an important technique for sustained competitive advantage. Measures of customer satisfaction, based on a variety of survey techniques, have been developed and are well known. Survey techniques include: telephone interviews, emailed survey forms, and web site "intercepts." All such techniques have the commonalities of being time consuming and expensive to perform. An example well-known measure of customer satisfaction is the American Consumer Satisfaction Index (ACSI). The ACSI is produced by the ACSI LLC, a private company based in Ann Arbor, Mich., U.S.A.

More recently, however, customers are using online tools to express their opinions about a wide range of products and services. Many such online tools can be described as being under the general category of "Social Media" (or SM). Online tools in this category include, but are not limited to, the following:

- FACEBOOK, Inc. (Menlo Park, Calif., U.S.A.)
- TWITTER, Inc. (San Francisco, Calif., U.S.A.)
- all variety of "web logs" or "blogs"
- all variety of "Web 2.0" sites, that facilitate feedback from a site's audience or readers The availability of such SM content raises the question of whether, with appropriate technology, it can be used to provide information similar to traditional customer satisfaction measures.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF PREFERRED EMBODIMENTS

Reference will now be made in detail to various embodiments of the invention, examples of which are illustrated in the accompanying drawings. Wherever possible, the same reference numbers will be used throughout the drawings to refer to the same or like parts.

Please refer to the Section 3 ("Glossary of Selected Terms") for the definition of selected terms used below.

Table of Contents to Detailed Description

1 Sentiment Measurement
- 1.1 Overview and Related Applications
- 1.2 Consumer Sentiment Search
- 1.3 Sentiment Analysis
- 1.4 Brand Analysis
- 1.5 Temporal Dimension
- 1.6 Correlation With Known Metrics
- 1.7 Lack of Correlation Between Metrics
- 1.8 SWOT-type Analysis 2 Additional Information
- 2.1 Word Lists
- 2.1.1 Example Quadrant Word List: Positive-Weak
- 2.1.2 Example Quadrant Word List: Positive-Strong
- 2.1.3 Example Quadrant Word List: Negative-Strong
- 2.1.4 Example Quadrant Word List: Negative-Weak
- 2.2 Computing Environment 3 Glossary of Selected Terms

1 Sentiment Measurement

1.1 Overview and Related Applications

In addition to being incorporated by reference in their entirety, the description presented herein specifically relies on many sections of the Related Applications. A specific Related Application can be referred to as "the '123 application," where '123 is the last three digits of the Application Number of a Related Application. A specific section of a Related Application can also be referenced herein by using any of the following conventions:

Section X, '123

Section X, '123 ("Title")

Section X, '123, "Title"

Where:

'123 is the last three digits of the Application Number of the Related Application being referenced;

"X" is the number of a section, as it is numbered within an Application '123; and "Title" is the title of the section referenced (optional).

Section 4, '837 ("FBSE") describes a Frame-Based Search Engine (or FBSE). This FBSE is a more generic form of the kind of search described herein in Section 1.2 ("Consumer Sentiment Search").

Section 4.2, '837 discusses frames as a form of concept representation (Section 4.2.1) and the use of frame extraction rules to produce instances of frames (Section 4.2.2). A pseudo-code format for frame extraction rules is presented in Section 6.2, '837 ("Frame Extraction Rules").

Snippets are discussed in Section 6.4, '837.

Parts of the '837 application are repeated, in this section, for convenience to the reader.

Figure 12:
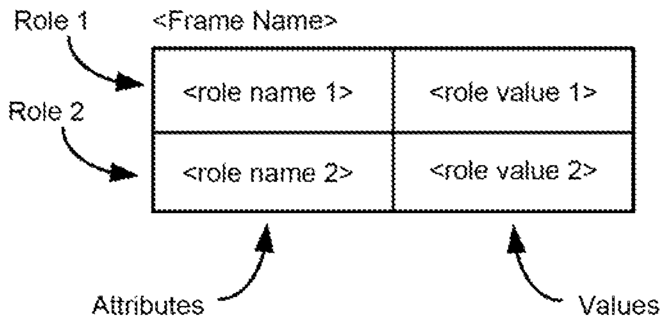
FIG. 12 shows a generic frame comprised of two roles.

In general, a frame is a structure for representing a concept, wherein such concept is also referred to herein as a "frame concept." A frame specifies a concept in terms of a set of "roles." Any type of concept can be represented by a frame, as long as the concept can be meaningfully decomposed (or modeled), for the particular application, by a set of roles. FIG. 12 shows a generic frame comprised of two roles. A frame can be referred to by a unique label called a "frame name" (in FIG. 12, a location, where a frame name can be stored, is shown as <Frame Name>). Each role of a frame can be represented by a collection of attributes, of which the "role name" is shown in FIG. 12. The role name stores a label for a role that is unique (at least within its frame). In FIG. 12, the two locations, where a role name can be stored, are shown as <role name 1> and <role name 2>.

When a frame concept is detected, for a particular UNL (see below Glossary of Selected Terms for definition) in a corpus of natural language, a frame "instance" is created. The instance has, for each applicable frame role, a "role value" assigned. A role value represents a particular, of how the frame concept is being used, by the UNL where the frame concept is detected. In FIG. 12, the two locations, where a role value can be stored, are shown as <role value 1> and <role value 2>. Detection, of whether a frame concept is applicable, can be determined by a set of linguistic rules, each rule herein called a "frame extraction rule." A set of frame extraction rules, that all relate to a particular frame, can be called the frame's "Rule Set." Ideally, a frame's Rule Set is able to detect whenever the frame's frame concept is being used, and thereby produce a frame instance representing each particular use of the frame concept. "Frame extraction," as used herein, refers to the utilization of a frame extraction rule to determine whether a frame is invoked by a UNL.

If a large corpus of interest (or "C_of_I") is to be searched, such as a significant portion of the online information available on the Internet, in order to have a practical Frame-Based Search Engine (or FBSE) it is typically necessary to perform a large amount of pre-query scanning and indexing of the C_of_I. An overview of this process is discussed at Section 4.1, '837 and Section 4.3.2.1, '837. The basic steps, of an FBSE, are:

1. Instance Generation: Includes pre-query, large-scale, application of a frame of interest. The database produced, by such large-scale frame application, can be called a "Frame-Based DataBase" (FBDB), with the frame (or frames) applied called the "Organizing Frame." The FBDB produced is typically an Inverted Index Database (or IIDB). However produced, the FBDB is searched according to the user's query and an initial set of result instances (called the "instance superset") is produced.
2. Instance Merging: Merges together instances of the instance superset. Merging is typically done because, from the perspective of a user, seemingly independent instances are more efficiently reviewed as part of a same instance "x." If a merge is deemed appropriate, the previously independent instances can be re-classified as just different "instance-mentions." The result of merging can be referred to as the "merged superset."

3. Instance Selection: Selects instances from a set of instances (such as the merged superset), for inclusion in a search result, according to the criteria of a user's query.

The above-described steps can be accomplished using, for example, the computing environment described in Section 2.2. Regarding ordering of the steps, Instance Generation is performed before the steps of Instance Merging or Instance Selection. Instance Merging and Instance Selection, however, can be performed in either order (or even concurrently), depending upon the particular application.

1.2 Consumer Sentiment Search

An example application, within which the present invention can be utilized, is the performance by a "brand manager" of a "consumer sentiment search." In relation to a brand of consumer product (or a "C_Brand"), a brand manager is a person responsible for the continued success of her or his brand. Such brand managers are often interested in consumer sentiment toward his or her C_Brand. A type of search to accomplish this, described in Section 2.1, '294 ("Consumer Sentiment Search"), is called a "consumer sentiment search."

The '294 application describes the searching of a database that includes the collection, in a large scale and comprehensive way, of postings (such as "tweets" on Twitter) to Social Media (SM) web sites or services. Such a Social Media inclusive database is referred to as "SM_db," and its basic elements are called documents (even though, in Social Media, an individual posting may be quite short). To create a suitably fast search tool, the '294 application describes comprehensive pre-query scanning, of the documents of SM_db, for instances of a suitable frame.

An example frame, suitable for a consumer sentiment search, is the following "Sentiment" frame (each role name has the suffix "_Role," with a brief explanation following):

Agent_Role: The entity that expresses the "sentiment."

Object_Role: The object (for example a C_Brand) towards which the "sentiment" is expressed.

Sentiment_Role: A particular sentiment (or emotion), if any, expressed by the Agent towards the Object.

Behavior_Role: A particular behavior, if any, expressed by the Agent towards the Object.

Aspect_Role: A particular quality or property, if any, expressed by the Agent towards the Object.

The above "Sentiment" frame is typically applied to the analysis of an individual sentence. Following is an example focus sentence, to which appropriate Natural Language Processing (NLP) can be applied to produce an instance of the "Sentiment" frame. The following example sentence discusses a fictitious brand of soda called "Barnstorm":

"My children love Barnstorm Soda and buy it all the time because of its taste."

Given a suitable NLP analysis, by application of suitable frame extraction rules, the following instance of the "Sentiment" frame can be produced:

Agent_Role: "My children"

Object_Role: "Barnstorm Soda"

Sentiment_Role: "love"

Behavior_Role: "buy"

Aspect_Role: "taste"

For each instance of the "Sentiment" frame found, the '294 application describes the sentence, where the frame concept is found, as a "focus sentence." In addition, a three sentence "snippet" is created, comprised of the focus sentence along with the sentences before and after the focus sentence. A single type of record, called a "SentenceObj," is described as being created, with the SentenceObj including both the focus sentence and the snippet as fields. (The snippet described in Section 6.4, '837, "Snippet Formation" has a length of five sentences but, because of the general brevity of SM, a three sentence snippet has been found to be effective.) Section 2.1, '294, states that these fields (i.e., the fields for the focus sentence and snippet) can be called, respectively, "FocusSentence" and "Snippet." Each field can be indexed and therefore available for queries. Further, each SentenceObj can be the root of its own "cluster" of records. Including the SentenceObj, the cluster can be hierarchically organized to contain the following three record types:

1. SentenceObj: Primary purpose is to represent focus sentence of snippet.
   - Permits searching, by focus sentence content, at indexed field "FocusSentence."
   - Permits searching, by snippet that includes the focus sentence, at indexed field "Snippet."
   - 1.1. InstanceObj: Represents an instance, for each frame found in focus sentence. Permits searching, by frame type, at indexed field "FrameType."
     - 1.1.1. RoleObj: Represents the roles, for each instance. Permits searching, by role value content, at indexed field "Value."

This hierarchy of three record types can be referred to herein as the "Consumer Sentiment Hierarchy" or "CSH."

Figure 10:
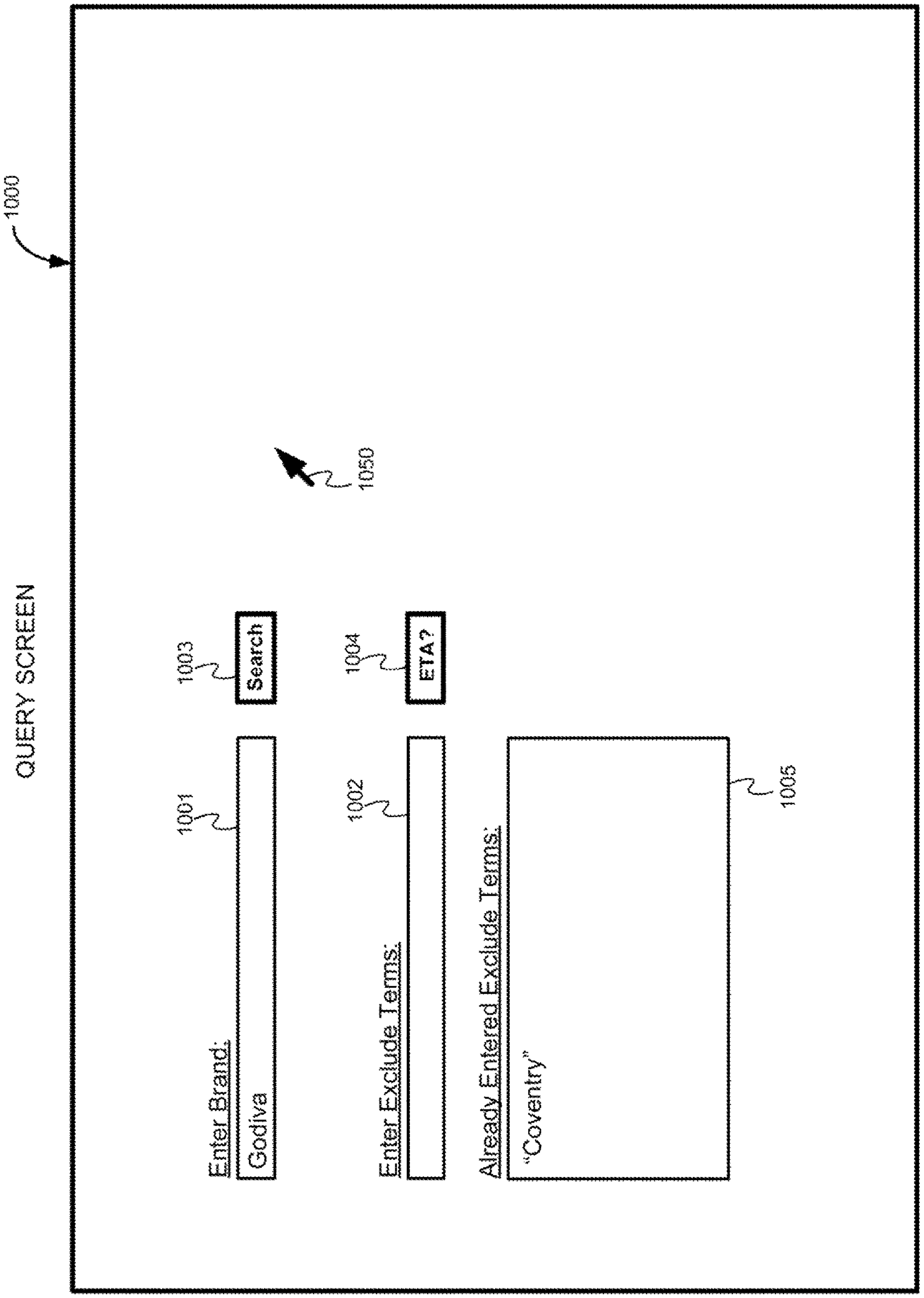
FIG. 10 shows an example User Interface (or UI) for entering a consumer sentiment search.

An example User Interface (or UI), for entering a consumer sentiment search, is shown in FIG. 10. FIG. 10 depicts a query-entry screen 1000, for the investigation of C_Brands, that contains the following items:

Search term entry box 1001: one or more lexical units, each of which if found in a focus sentence is regarded as indicating a possible occurrence of a C_Brand, are entered here. In the diagram, only the single lexical unit "Godiva" is shown. A search, based on the lexical units of box 1001, can be initiated by a user selecting the "Search" button 1003 with mouse pointer 1050.

Exclude term entry box 1002: one or more lexical units, each of which if found in a focus sentence's snippet is used to exclude that focus sentence, are entered here. Once an exclude term is entered, it appears in box 1005. In the diagram, only the single lexical unit "Coventry" is shown. (Section 2.2, '294, describes a tool, called "Exclusion Term Assistant," or ETA, that can be used to help identify Exclude Terms. Use of this ETA can be initiated by a user selecting the "ETA" button 1004 with mouse pointer 1050.)

The CSH provides a number of options, regarding exactly how a consumer sentiment search is performed, including the following:

The lexical units, representing a brand, can be searched for appearance anywhere in a focus sentence.

The lexical units, representing a brand, can be searched for appearance anywhere in the Object_Role of each instance.

Figure 11:
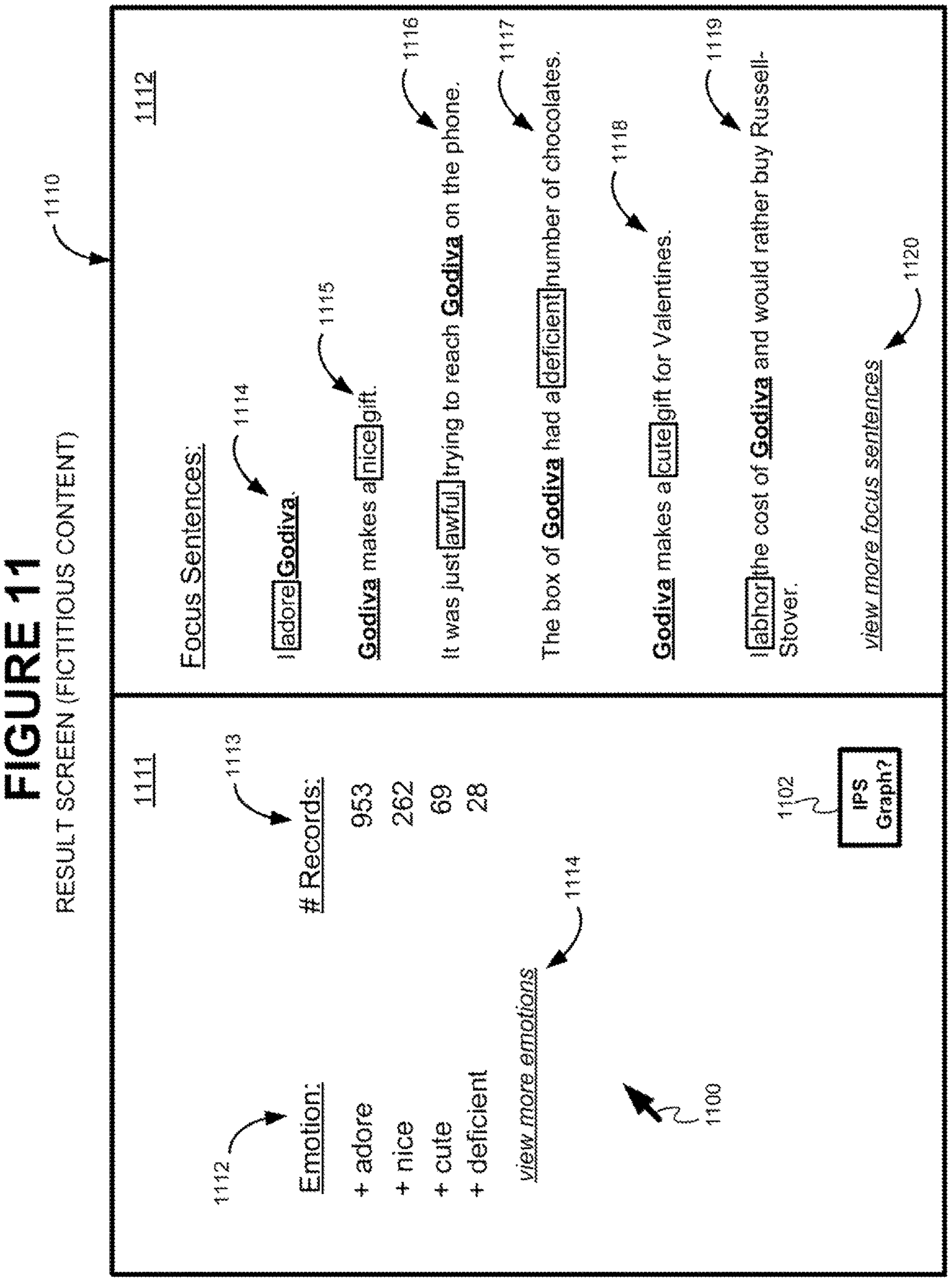
FIG. 11 shows an example result, of a consumer sentiment search.

Regardless of how it is performed, an example result, of the consumer sentiment search input of FIG. 10, is shown in FIG. 11. FIG. 11 shows a result screen 1110, divided into two halves: an emotion-listing half 1111 and a focus-sentence listing half 1112.

The emotion-listing half 1111 consists of two columns: a column that summarizes the emotions found (column 1112) and a column that shows, for each emotion listed, the number of records in which it occurs (column 1113). A plus sign (i.e., "+") is shown next to each emotion of column 1112. This indicates that each emotion is representative of a group of related expressions, with the members of the group made visible by selecting the plus sign with mouse pointer 1100. If desired by the user, more emotions can be listed by selecting link 1114 ("view more emotions") with mouse pointer 1100.

Focus-sentence listing half 1112 shows 6 example focus sentences of the search result, numbered 1114-1119. If desired by the user, more focus sentences can be listed by selecting link 1120 ("view more focus sentences") with mouse pointer 1100. Each focus sentence is shown with two parts emphasized:

1. The part of the sentence matching a lexical unit representative of the brand (in this case, "Godiva"). While any form of graphical emphasis can be used, underlining is shown in FIG. 11.
2. The part of the sentence matching a lexical unit representative of the sentiment detected. While any form of graphical emphasis can be used, such lexical units are emphasized, in FIG. 11, by outlining them with a box. Thus, for example, in focus sentence 1115, the emotion conveying word "nice" has a rectangular outline.

1.3 Sentiment Analysis

A first embodiment of the present invention permits further analysis, for example, of a consumer sentiment search, such as the kind discussed in the previous section.

Stated more generally, a first embodiment of the present invention permits the sentiment of each statement to be evaluated along at least one, or both, of the following two (relatively independent) dimensions:

- polarity (i.e., whether the sentiment is generally positive or negative) and
- intensity (i.e., whether the sentiment is generally strong or weak).

As used herein, each statement of the first corpus can be any type of UNL, although the type of UNL focused upon herein consists of a single sentence. As used herein, the first corpus can consist of UNL's drawn from any source or sources, although the sources focused upon herein are those of Social Media (as discussed above).

As used herein, the kind of object, about which statements can be subject to sentiment analysis, can be almost anything capable of being given a name. Some example types of objects, not intended to be limiting, include:

- product categories (e.g., chocolate, online media services, detergents, etc.)
- product brands
- categories of people (e.g., politicians, policemen, etc.)
- famous individuals (e.g., movie stars)
- diseases
- companies or any other type of organizations
- geographical locations of any kind (e.g., cities, countries, mountains, etc.)

For each UNL of the first corpus, for which at least one type of instance is extracted of a frame "F," that frame "F" is regarded (for purposes of example) as containing at least the following two roles (as these roles are described above, in Section 1.2, "Consumer Sentiment Search"):

1. Object_Role
2. Sentiment_Role

Figure 1A:
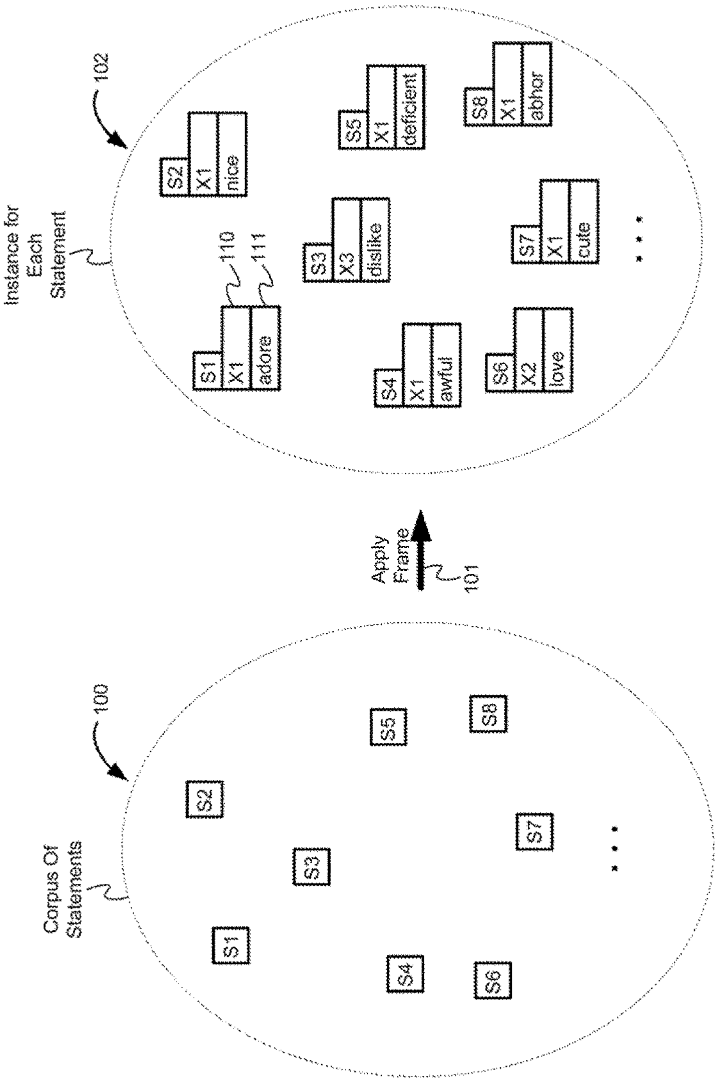
FIG. 1A depicts an example first corpus 100 converted to an instanced corpus 102.

A first corpus, once it has had an instance of "F" extracted for each of its statements, can be referred to herein as an "instanced corpus." FIG. 1A depicts an example first corpus 100, in which are shown 8 example statements, labeled S1 to S8. An ellipsis is included, at the bottom of corpus 100, to indicate that many more statements may be included. An arrow 101 indicates application of any suitable frame "F," to each statement of corpus 100, to produce instanced corpus 102 (In the terminology of above Section 1.1, "Overview and Related Applications," instanced corpus 102 corresponds to an instance superset.) Corpus 102 depicts each statement of corpus 100, along with the role values of an instance extracted. Each instance of corpus 102 is extracted according to a frame "F," where (for purposes of FIG. 1A) the upper and lower role values correspond to, respectively:

1. Object_Role (e.g., instance for S1 has a value of "X1" for Object_Role 110)
2. Sentiment_Role (e.g., instance for S1 has a value of "adore" for Sentiment_Role 111)

It can be observed that, for the 8 statements shown, instanced corpus 102 addresses the following three objects:

1. X1 (statements S1, S2, S4, S5, S7, S8)
2. X2 (statement S6)
3. X3 (statement S3)

Figure 1B:
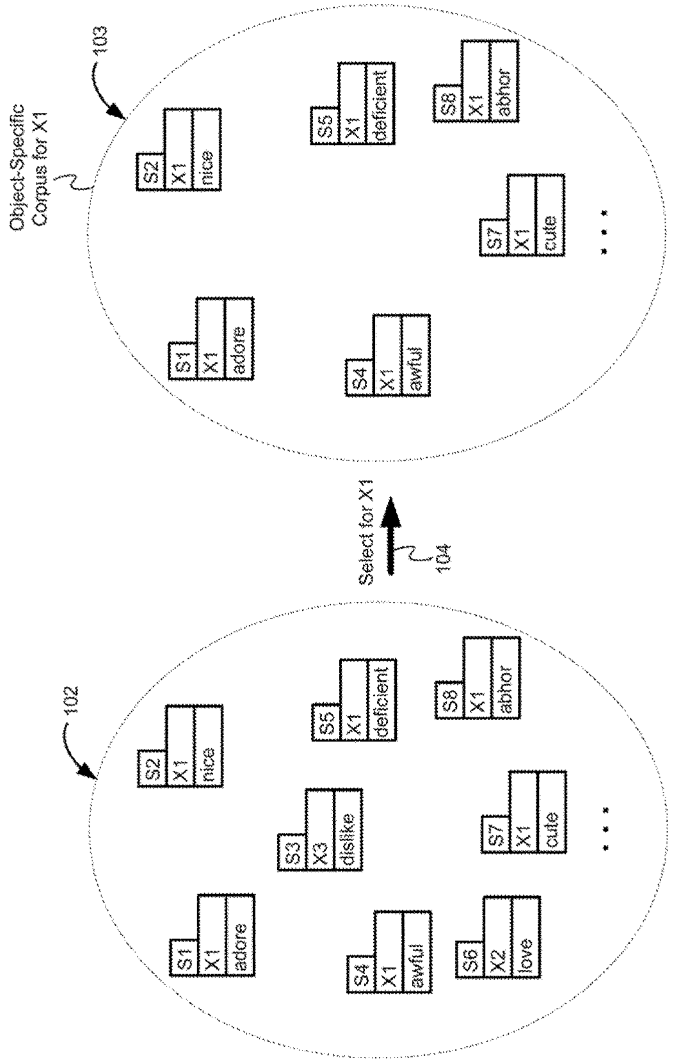
FIG. 1B depicts instanced corpus 102 converted to object-specific corpus 103.

A following stage of analysis is shown in FIG. 1B. In this next stage, an object-specific corpus is produced by selecting, from an instanced corpus, only those instances that refer to a same object. (An object-specific corpus corresponds to, in above Section 1.1, "Overview and Related Applications," a search result that may or may not have been subject to instance merging). For example, FIG. 1B shows an object-specific corpus 103 produced from instanced corpus 102 by selecting for an object X1 (the selection for X1 indicated by arrow 104).

Object-specific corpus 103 can be related to the consumer sentiment search result, described in above Section 1.2 and illustrated by FIG. 11. To relate FIG. 1B to FIG. 11, one need only add the additional assumption that X1 of FIG. 1B corresponds to "Godiva" of FIG. 11. The transition in FIG. 1B, from instanced corpus 102 to object-specific corpus 103, can be compared to, in above Section 1.2, the transition from a request for search, in FIG. 10, to the search result of FIG. 11.

Figure 2A:
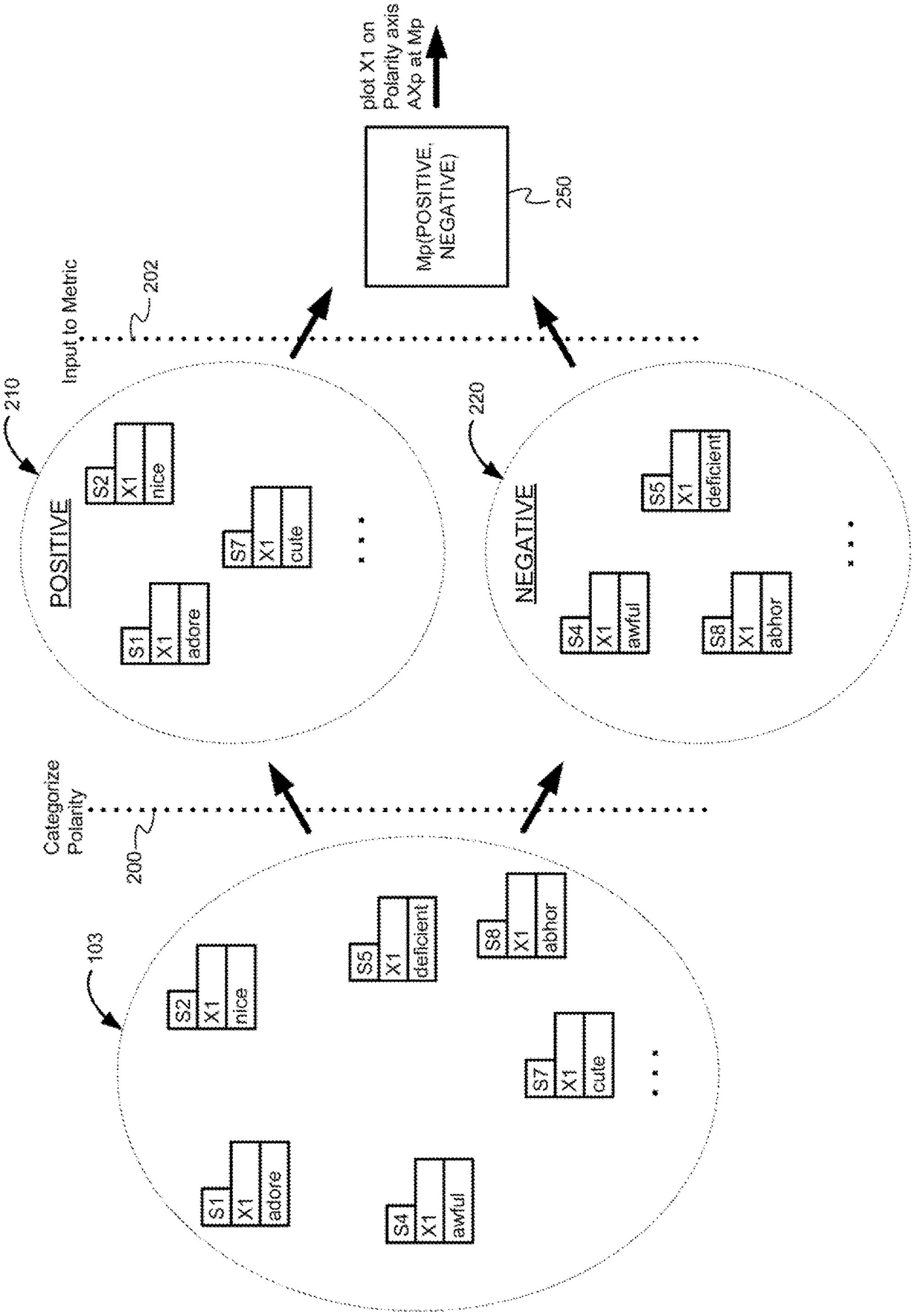
FIG. 2A depicts object-specific corpus 103 categorized according to the polarity of sentiment of its constituent instances.
Figure 2B:
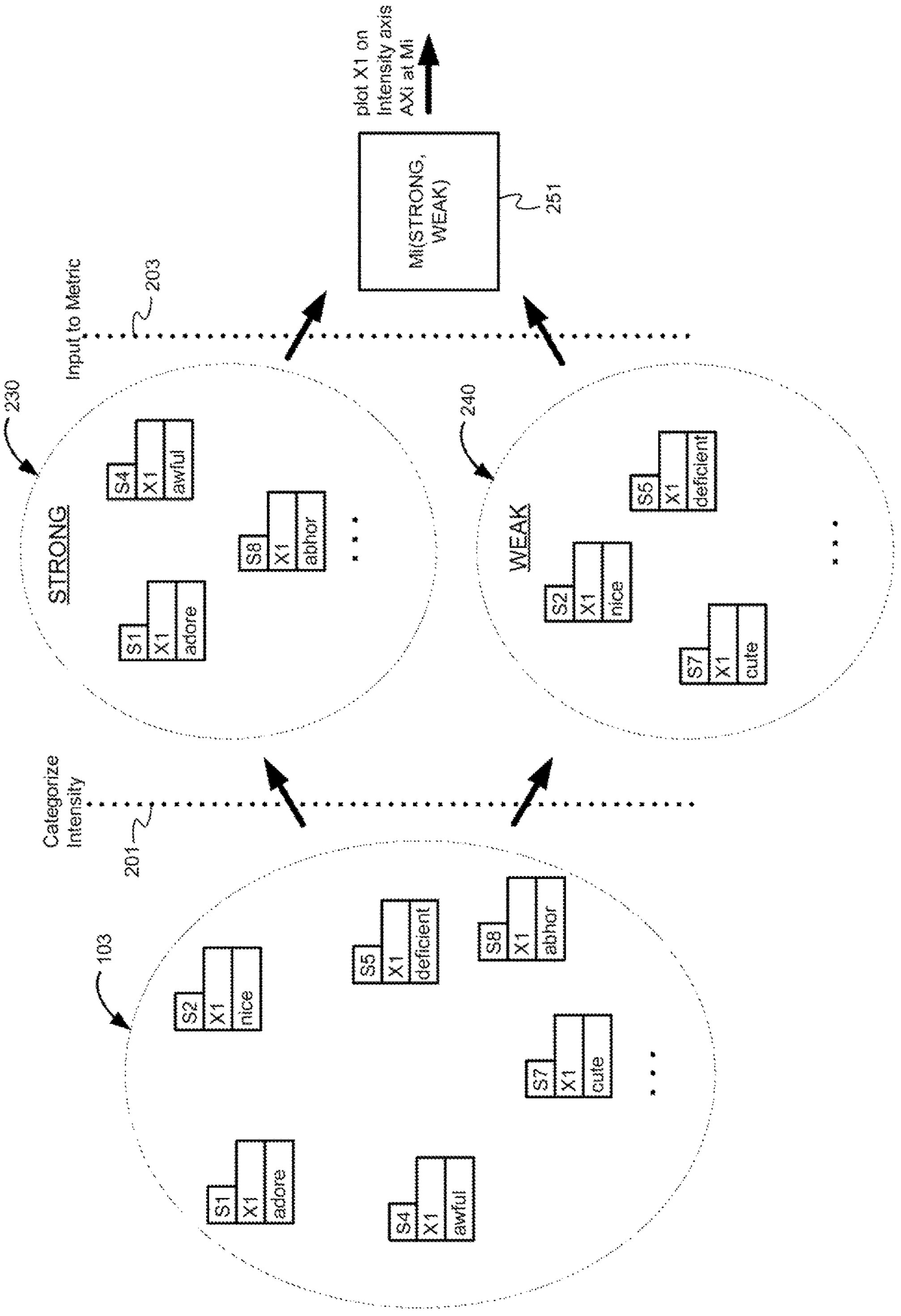
FIG. 2B depicts object-specific corpus 103 categorized according to the intensity of sentiment of its constituent instances.

A next stage of analysis is shown in FIGS. 2A-2B. This stage is typically comprised of at least one, or both, of the following two categorizations. Each categorization is performed on the members of an object-specific corpus.

In FIG. 2A, object-specific corpus 103 is categorized according to the polarity of sentiment, as expressed by the contents of the Sentiment_Role of each instance. Dotted line 200 indicates two arrows, indicating categorization according to one of two possibilities:

- POSITIVE (i.e., the sentiment expressed about the object is, to at least some extent, favorable) or
- NEGATIVE (i.e., the sentiment expressed about the object is, to at least some extent, negative).

Instances that express a positive sentiment (regardless of other relatively independent variables, such as the intensity of the positive sentiment), are put in the POSITIVE category (and can be referred to as a positive corpus). In the case of FIG. 2A, the POSITIVE instances are indicated as positive corpus 210. Similarly, instances that express a negative sentiment (regardless of other relatively independent variables, such as the intensity of the negative sentiment), are put in NEGATIVE category (and can be referred to as a negative corpus). In the case of FIG. 2A, the NEGATIVE instances are indicated as negative corpus 220.

Distinguishing between positive and negative sentiment can be accomplished by any suitable technique, including matching against positive and negative word (or lexical unit)

lists. A closest match can be sought, between the contents of a Sentiment_Role and a word of the two word lists.

Another categorization is shown in FIG. 2B, where object-specific corpus 103 is categorized according to the intensity of sentiment, as expressed by the contents of the Sentiment_Role of each instance. Dotted line 201 indicates two arrows, indicating categorization according to one of two possibilities:

- STRONG (i.e., the sentiment expressed about the object is strong, but this does not indicate the polarity of such sentiment) or
- WEAK (i.e., the sentiment expressed about the object is weak, but this does not indicate the polarity of such sentiment).

Instances that express a strong sentiment (regardless of other relatively independent variables, such as whether that intensity is in the positive or negative direction), are put in STRONG category (and can be referred to as a strong corpus). In the case of FIG. 2B, the STRONG instances are indicated as strong corpus 230. Similarly, instances that express a generally weak sentiment (regardless of other relatively independent variables, such as whether that intensity is in the positive or negative direction), are put in WEAK category (and can be referred to as a weak corpus). In the case of FIG. 2B, the WEAK instances are indicated as weak corpus 240.

As discussed in section 2.1 below ("Word Lists"), the categorization word lists, for determining positive or negative polarity, can be created as follows:

- Positive Word List: union of quadrant word lists "Positive-Strong" and "Positive-Weak"
- Negative Word List: union of quadrant word lists "Negative-Strong" and "Negative-Weak"

As with polarity, distinguishing between strong and weak sentiment can be accomplished by any suitable technique, including matching against strong and weak categorization word lists. A closest match can be sought, between the contents of a Sentiment_Role and a word of the two word lists. As discussed in section 2.1 below ("Word Lists"), the categorization word lists, for determining strong or weak intensity, can be created as follows:

- Strong Words List: union of quadrant word lists "Positive-Strong" and "Negative-Strong"
- Weak Words List: union of quadrant word lists "Positive-Weak" and "Negative-Weak"

Once the instances, of an object-specific corpus, have been categorized, the categorization data can be input to at least one metric. In general, a metric accepts a categorized corpus as input and produces a value (or values) that represent a summarization, with respect to the category, of such corpus.

A polarity metric accepts, as input, positive and negative corpuses. While any suitable function can be used, in general, the output of a polarity metric indicates the extent to which, overall (or in "net"), the positive or negative corpus dominates. Such a metric is also referred-to herein as a "Net Polarity Metric" or NPM. FIG. 2A depicts a Metric 250, indicated as a function "Mp," that (per the arrows indicated by dotted line 202) takes positive corpus 210 and negative corpus 220 as inputs. For purposes of example, we will assume that Mp is a function of the following two values:

- Np=the number of statements represented by the positive corpus, and
- Nn=the number of statements represented by the negative corpus.

Using Np and Nn as input, Mp can be a function that produces the following range of values:

- +1: when Np+Nn=Np (meaning all statements, of the object-specific corpus, have been categorized as positive)
- 0: when Nn=Np (meaning an equal number of statements, of the object-specific corpus, have been categorized as positive or negative)
- −1: when Np+Nn=Nn (meaning all statements, of the object-specific corpus, have been categorized as negative)

Following is a suitable function for Mp:

$$\frac{Np - Nn}{Np + Nn}$$

An intensity metric accepts, as input, strong and weak corpuses. While any suitable function can be used, in general, the output of an intensity metric indicates the extent to which, overall (or in "net"), the strong or weak corpus dominates. Such a metric is also referred-to herein as a "Net Intensity Metric" or NIM. FIG. 2B depicts a Metric 251, indicated as a function "Mi," that (per the arrows indicated by dotted line 203) takes strong corpus 230 and weak corpus 240 as inputs. For purposes of example, we will assume that Mi is a function of the following two values:

- Ns=the number of statements represented by the strong corpus, and
- Nw=the number of statements represented by the weak corpus.

Using Ns and Nw as input, Mi can be a function that produces the following range of values:

- +1: when Ns+Nw=Ns (meaning all statements, of the object-specific corpus, have been categorized as strong)
- +0.5: when Nw=Ns (meaning an equal number of statements, of the object-specific corpus, have been categorized as strong or weak)
- 0: when Ns+Nw=Nw (meaning all statements, of the object-specific corpus, have been categorized as weak)

Following is a suitable function for Mi:

$$\frac{\left[\frac{Ns - Nw}{Ns + Nw}\right] + 1}{2}$$

Figure 3A:
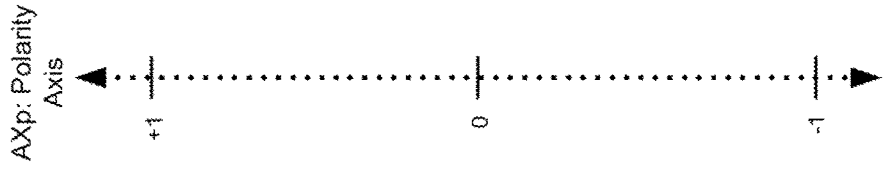
FIG. 3A shows an Axis "AXp," representing polarity in a vertical direction.
Figure 3B:
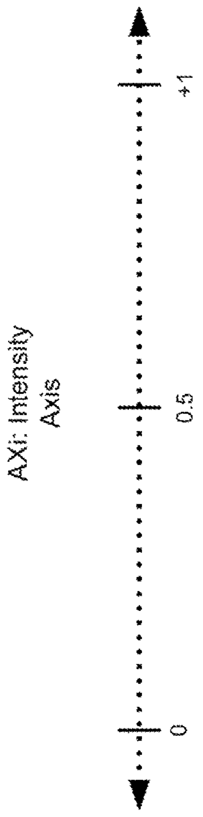
FIG. 3B shows an Axis "AXi," representing intensity in a horizontal direction.

Given a specified range of values for an NPM and/or NIM, such as the ranges provided above, a graphical representation, of an object-specific corpus, can be produced by assigning an axis to each metric utilized. For example, for the ranges specified above:

- FIG. 3A shows an Axis "AXp," representing polarity, in a vertical direction and
- FIG. 3B shows an Axis "AXi," representing intensity, in a horizontal direction.

(The choice of "vertical" or "horizontal," for each of AXp and AXi, can be made arbitrarily, or upon the needs of each particular application.)

Figure 4A:
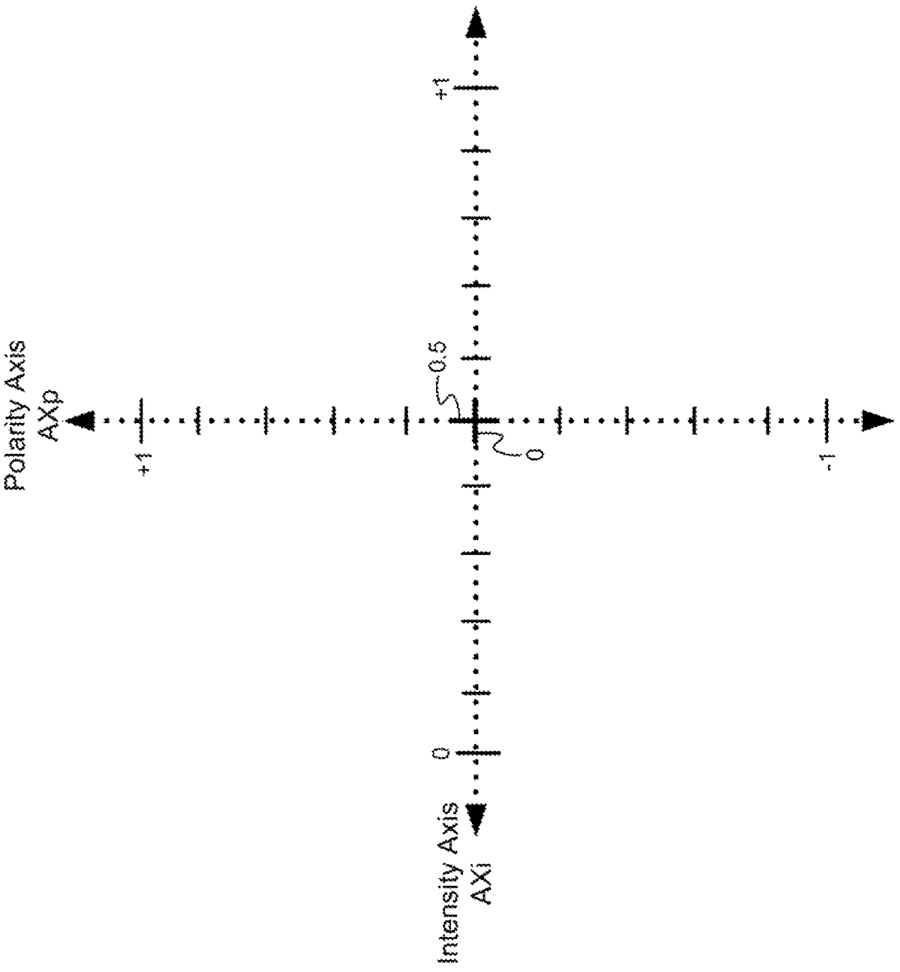
FIG. 4A shows axes AXp and AXi joined together, to create a two-dimensional mapping space referred to herein as an intensity-polarity sentiment graph.
Figure 4B:
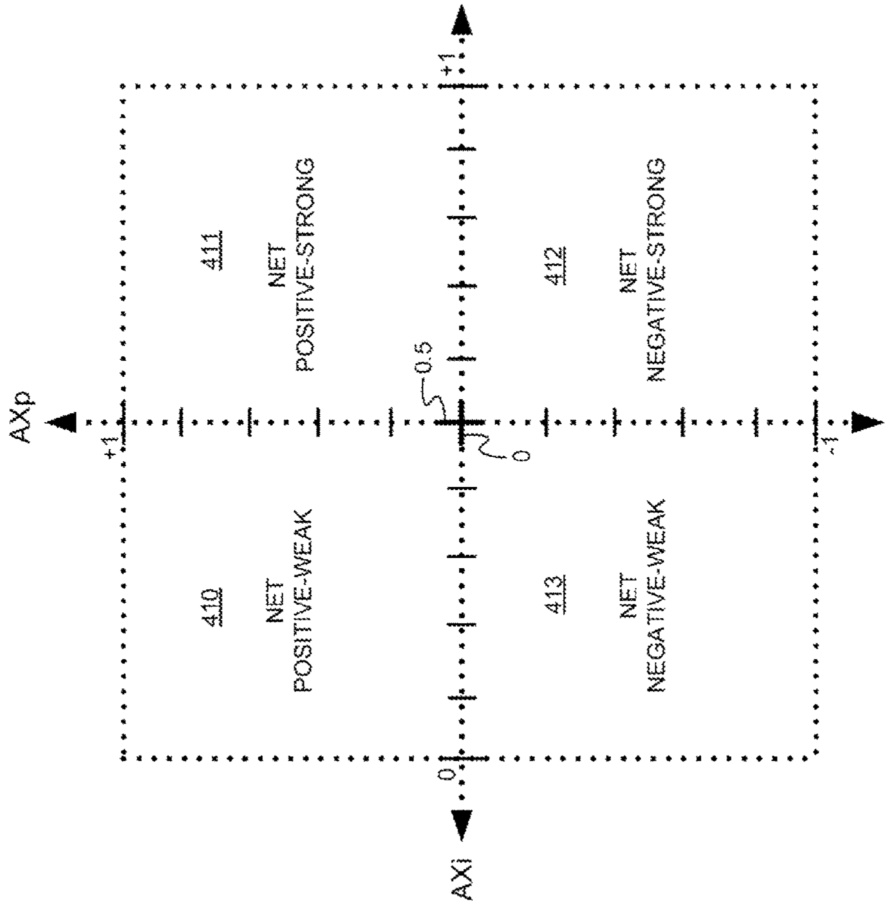
FIG. 4B is the same as FIG. 4A, except the two-dimensional mapping space is shown divided into quadrants formed by the intersection of the two axes.

In FIG. 4A, axes AXp and AXi have been joined together, to create a two-dimensional mapping space. Any graph of sentiment data, having polarity and intensity axes such as those in FIG. 4A, can be referred to herein as an intensity-polarity sentiment graph (or an "IPS graph"). FIG. 4B is the same as FIG. 4A, except the two-dimensional mapping space is shown divided into quadrants. The quadrants are formed by the intersection of the two axes.

Starting from the quadrant of the upper-left (quadrant 410), and proceeding in a clockwise fashion, each quadrant of FIG. 4B can be described as follows:

410: This quadrant is called "Net Positive-Weak" because any object-specific corpus, mapped into this quadrant, is:
   i. within the upper half of the polarity range and therefore has more statements of positive polarity than negative polarity (i.e., it is "Net Positive"); and
   ii. within the lower half of the intensity range and therefore has more statements of weak intensity than strong intensity (i.e., it is "Net Weak").

411: This quadrant is called "Net Positive-Strong" because any object-specific corpus, mapped into this quadrant, is:
   i. still "Net Positive" for the same reasons discussed above for quadrant 410; and
   ii. within the upper half of the intensity range and therefore has more statements of strong intensity than weak intensity (i.e., it is "Net Strong").

412: This quadrant is called "Net Negative-Strong" because any object-specific corpus, mapped into this quadrant, is:
   i. within the lower half of the polarity range and therefore has more statements of negative polarity than positive polarity (i.e., it is "Net Negative"); and
   ii. still is "Net Strong" for the same reasons discussed above for quadrant 411.

413: This quadrant is called "Net Negative-Weak" because any object-specific corpus, mapped into this quadrant, is:
   i. still "Net Negative" for the same reasons discussed above for quadrant 412; and
   ii. within the lower half of the intensity range and therefore has more statements of weak intensity than strong intensity (i.e., it is "Net Weak").

Figure 5A:
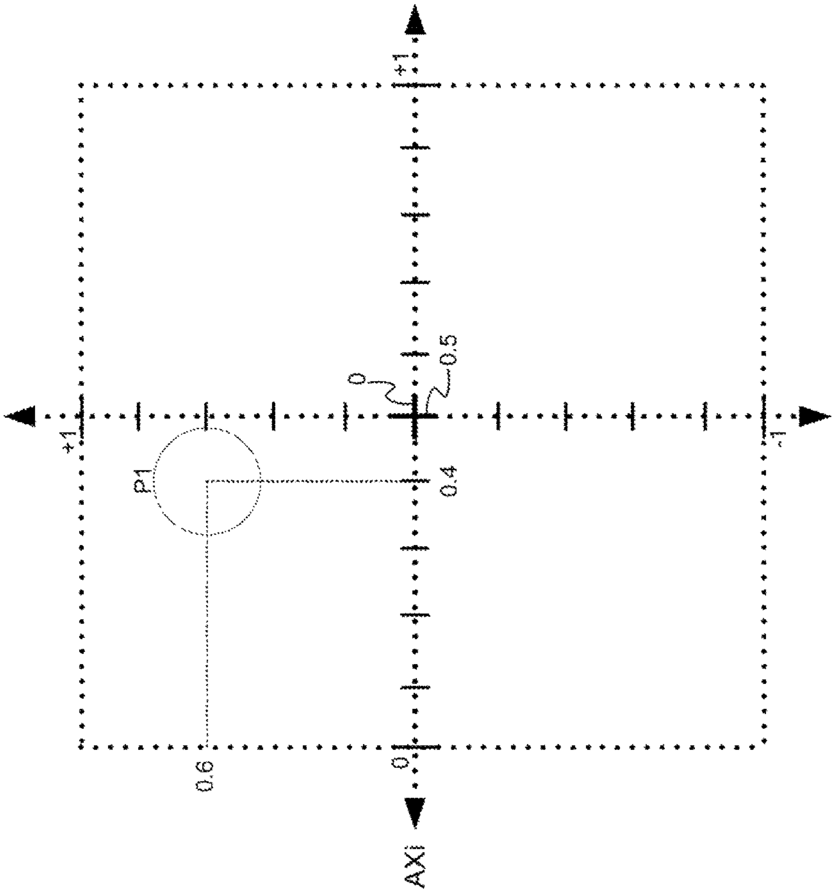
FIG. 5A depicts an example IPS graph, for an object-specific corpus P1.
Figure 5B:
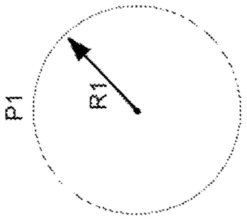
FIG. 5B illustrates that a circle, representing P1 on an IPS graph, has a radius R1.

FIG. 5A depicts an example IPS graph, of an object-specific corpus P1 (where P1 could be, for example, object-specific corpus 103). In this example, P1 is assumed to have an NIM=0.4 and an NPM=0.6. Although P1 could be represented by simply a point, another characteristic of P1 can also be displayed by representing P1 with a circle (or any other suitable two-dimensional shape). FIG. 5B illustrates that the circle, representing P1, has a radius R1. Radius R1 can vary, for example, in accordance with any suitable function of the total number of statements in P1. For example, the area of P1 can be made proportional to the number statements it represents.

If the consumer sentiment search result of Section 1.2 (and shown in FIG. 11) is the same as object-specific corpus 103, then P1 of FIG. 5A is a graphical representation of the "Godiva" search result.

Figure 6A:
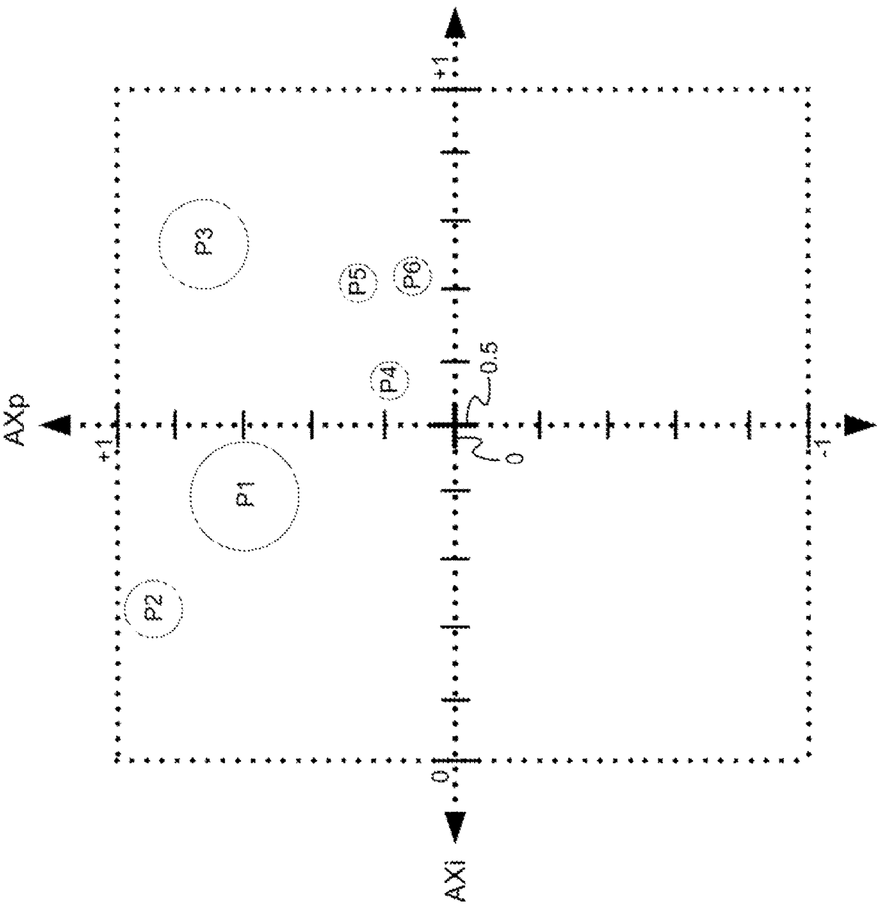
FIG. 6A shows an example Collection of Object-Specific corpuses, comprised of six object-specific corpuses, labeled P1-P6.

Multiple object-specific corpuses can be shown on a single IPS graph. FIG. 6A, for example, shows five object-specific corpuses, in addition to P1, labeled P2-P6. A Collection of Object-Specific corpuses can be referred to herein as a "COS," with the collection of FIG. 6A being called COS1. Each of these corpuses is assumed to have been graphed in the same fashion as shown for only P1 in FIG. 5A. A collection of object-specific corpuses can be produced in any suitable way. For example, starting with a single first corpus, multiple object-specific corpuses can be extracted. If, for example, it is desired to analyze brands of "chocolate," an example brand, for each of P1-P6, can be:

1. GODIVA
2. LINDT
3. FERRERO
4. GHIRARDELLI
5. TOBLERONE
6. RUSSEL-STOVER

The example of using IPS graphs for brand analysis is further discussed in below Section 1.4 ("Brand Analysis").

With regard to graphing a COS, the area of each object-specific corpus can be made proportional to the number statements it represents. Another possibility is to calculate a total number of statements, across all the object-specific corpuses of a COS, and then to make the area of each object-specific corpus proportional to its relative share of such total.

With respect to the quadrants of FIG. 4B, it can be seen that all the corpuses of FIG. 6A are in the positive half of the graph. Within this positive half, it can be seen the corpuses are divided as follows:

Weak-Positive: P1, P2

Strong-Positive: P3-P6

Figure 6B:
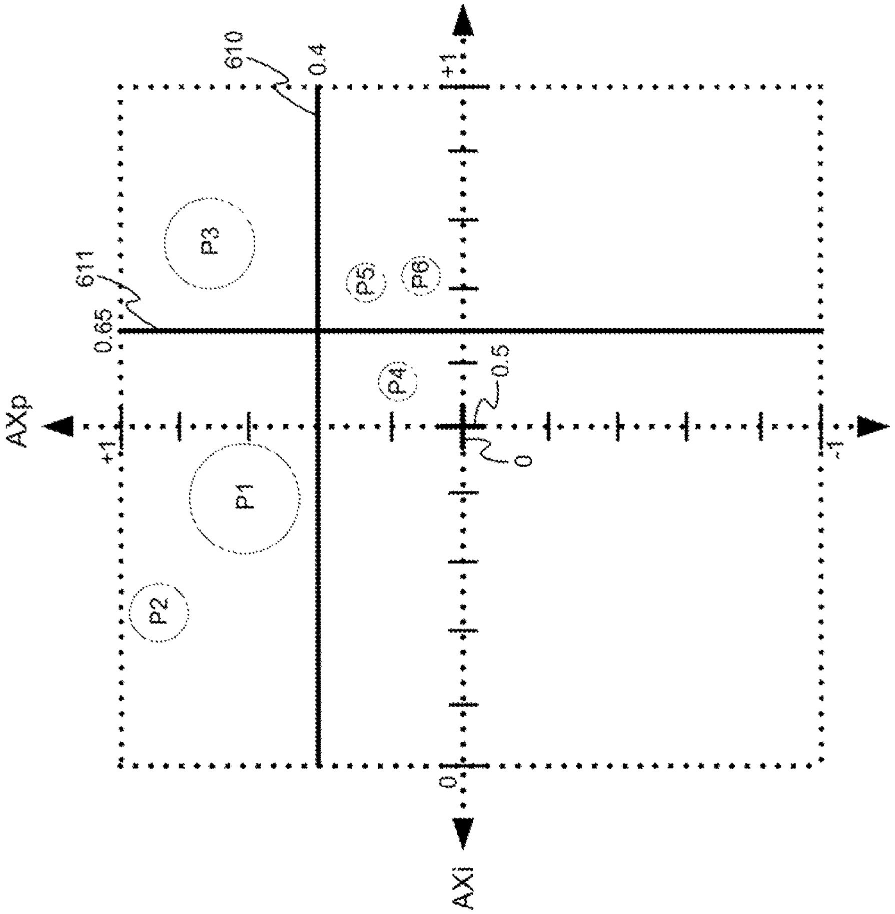
FIG. 6B shows a second technique, for dividing an IPS graph into quadrants, using a median for polarity and a median for intensity.
Figure 6C:
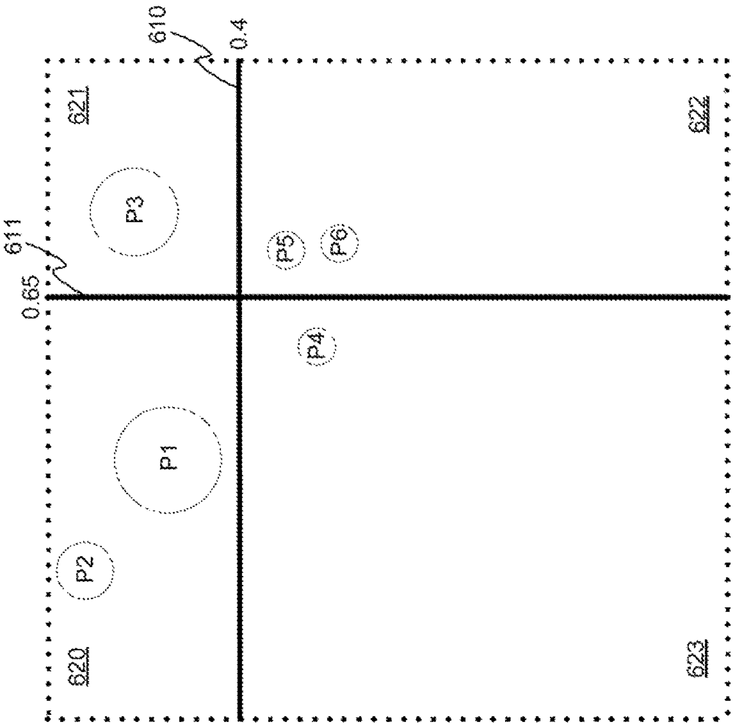
FIG. 6C illustrates the same technique as FIG. 6B, except, in order to emphasize the quadrants defined by the median values, axes AXp and AXi are deleted.

A second technique, for dividing an IPS graph into quadrants, is shown in FIG. 6B. Specifically, with respect to a collection of object-specific corpuses COSx, a median for polarity (i.e., median NPM) and intensity (i.e., median NIM) can be plotted. In the case of FIG. 6B, COS1 is shown relative to example medians, for polarity and intensity respectively, of 0.4 (line 610) and 0.65 (line 611). FIG. 6C is the same as FIG. 6B, except, in order to emphasize the quadrants defined by the median values, axes AXp and AXi are deleted. In a similar fashion to that discussed above for the quadrants of FIG. 4B, starting from the upper left of FIG. 6C, and proceeding clockwise, its quadrants are (with respect to median lines 610 and 611) as follows:

620, "Net Positive-Weak," contains: P1, P2.

621, "Net Positive-Strong," contains: P3.

622, "Net Negative-Strong," contains: P5, P6.

623, "Net Negative-Weak," contains: P4.

The medians plotted can be determined with respect to any suitable COS (also referred to herein as the COSm). In some situations, it may be best for COSm to be the same COS (also referred to herein as the "display COS") shown by the IPS graph itself. For example, in the case of FIG. 6B, where the displayed COS is COS1, the medians of COS1 itself can be used. In other situations, it may be desirable for COSm to be different from the display COS. For example, it may be desirable that COSm be broader than the display COS (perhaps much broader) so that the displayed COS can be shown in a broader and/or more stable context. Examples of this are discussed in the next Section 1.2 ("Brand Analysis").

Figure 7A:
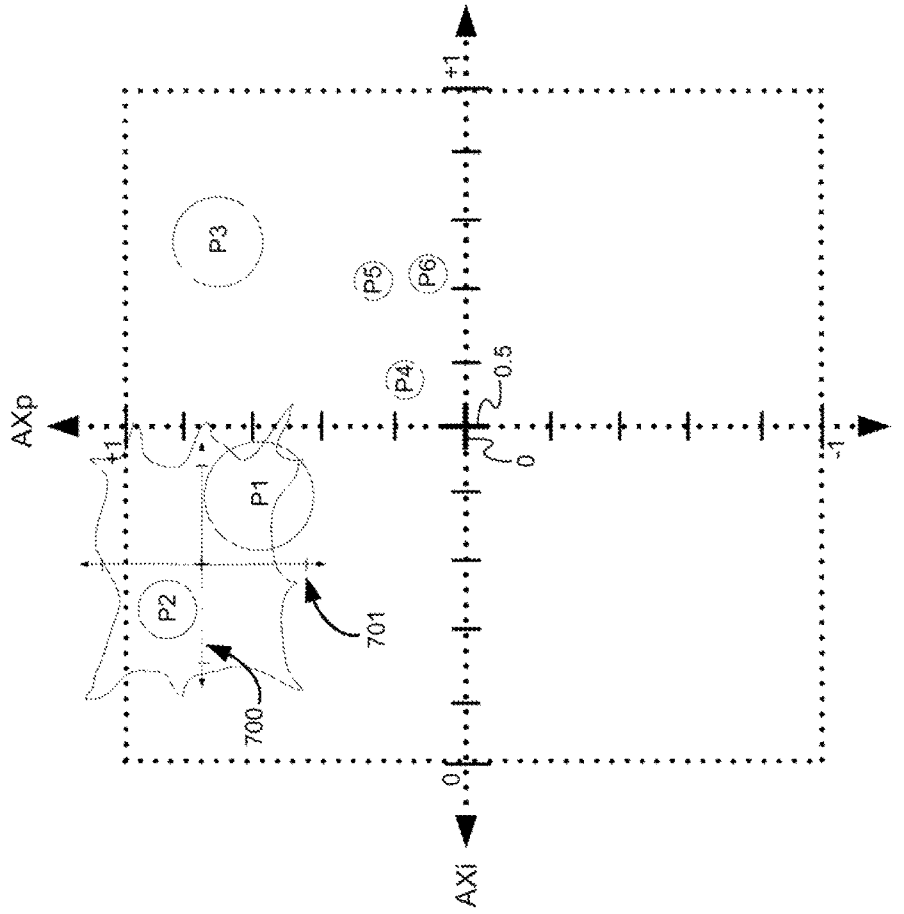
FIG. 7A presents a third technique, for dividing an IPS graph into quadrants, where a pair of axes is defined relative to a selected subset of a COS.
Figure 7B:
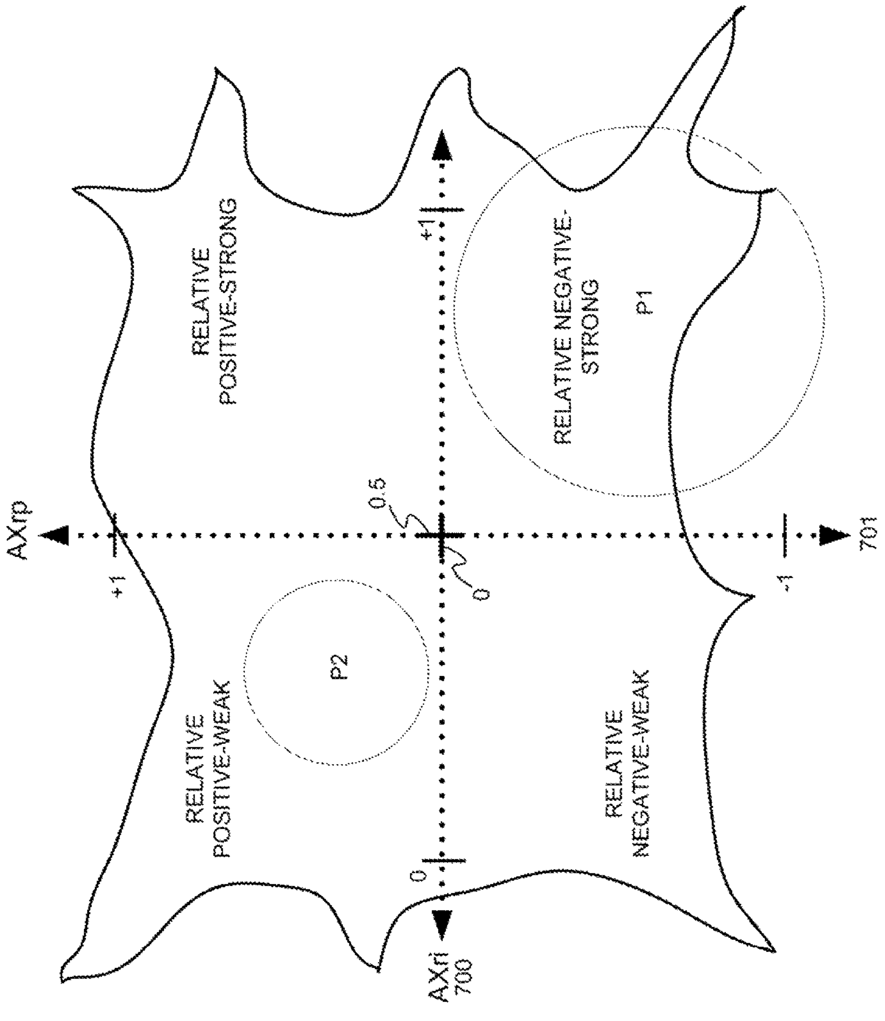
FIG. 7B shows a magnification of the quadrant-dividing axes of FIG. 7A.

A third technique, for dividing an IPS graph into quadrants, is shown in FIG. 7A. In this technique, a pair of axes are defined relative to a selected subset of a COS. In the example of FIG. 7A, a pair of axes 700 and 701 are defined relative to object-specific corpuses P1 and P2. A magnification of axes 700 and 701 is shown in FIG. 7B. FIG. 7B shows how, relative to axes 700 and 701, P1 is relatively Negative-Strong while P2 is relatively Positive-Weak. This is despite the fact that, within the broader context of axes AXi and AXp, both P1 and P2 are in the Positive-Weak quadrant. Such relative axes, however, are useful when, for example, finer-scale comparisons are to be performed between two (or more) object-specific corpuses. Thus, although P1 and P2 are Positive-Weak in a broad sense, it can be useful to observe that, relative to each other, P1 is Negative-Strong while P2 is Positive-Weak.

1.4 Brand Analysis

While any type of object (or entity) can be the subject of an IPS graph, an example area of application is the analysis of product brands.

In the case of FIGS. 6A-6C and 7A-7B, for example, each of the object-specific corpuses shown can be representative of a product brand, with all the brands shown being of a same product category. Example product categories can include, but are not limited to:

chocolate soda laundry detergents etc

If, for example, the product category is "chocolate," an example brand, for each of P1-P6, can be (while the following brands are actual names to aid illustration, of an example brand analysis within the U.S. market, the data presented herein is intended to be fictitious and for example purposes only):

1. GODIVA
2. LINDT
3. FERRERO
4. GHIRARDELLI
5. TOBLERONE
6. RUSSELL-STOVER

In the case of FIGS. 6B-6C, where the COS "COS1" is shown relative to medians (e.g., 610 and 611), such medians can be determined relative to a comprehensive COSm. The COSm can be based on a selection of brands far more comprehensive than the 6 particular brands displayed in FIGS. 6B-6C. Thus, even though only 6 brands of chocolate are shown (the display COS), medians 610 and 611 can be based upon a relatively exhaustive (and unshown) list of chocolate brands. In this way, the display of the chocolate brands, while only specifically showing the 6 brands selected, still places the 6 brands (for purposes of quadrant assignment) in a broader context of the entire chocolate industry.

Of course, medians 610 and 611 can be based upon any suitable level of exhaustive determination of metrics NPM and NIM. This broad range of options is made possible, at least in part, by the fact that an automated, frame-based, natural language processing system is used for the analysis. Thus, for example, the NPM and NIM values can be determined for hundreds of brands, across dozens of diverse industries. Medians 610 and 611 can then be used to place the particular brands, displayed in an IPS graph, within a very broad context.

In addition to providing a broader context, such broad-based medians can also provide a relatively stable context in which to evaluate the evolution, over time, of sentiment towards a brand.

1.5 Temporal Dimension

A temporal dimension can be added to a sentiment analysis. Section 1.3 discusses sentiment analysis as applied to a single "first corpus." Sentiment analysis, however, can be applied to a series of related corpuses. If each member of the series differs according to a time range, over which its constituent statements apply, then a time-varying sentiment analysis can be produced.

Objectives served, by a time-varying sentiment analysis, can include either or both of the following:

depiction of "trends"

provision of updated analysis results

Figure 8A:
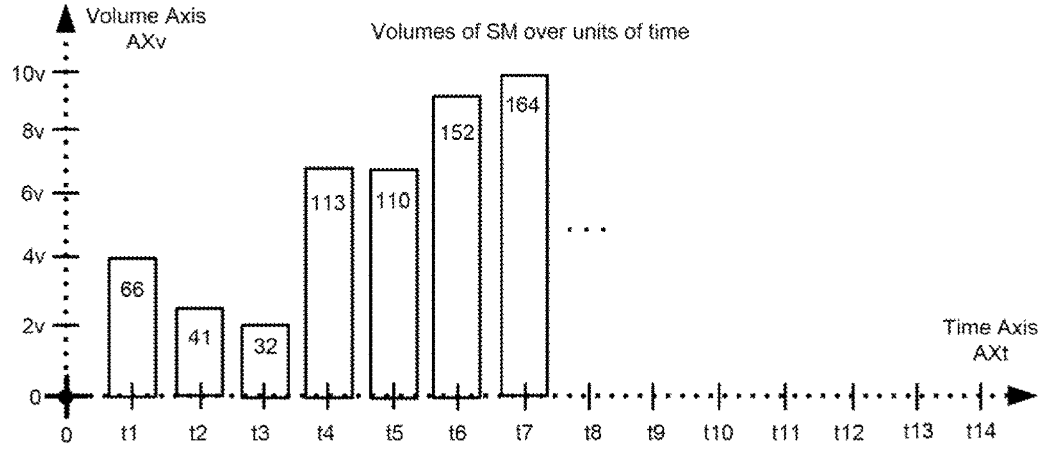
FIG. 8A presents an example illustration of a time-series of related corpuses.

FIG. 8A presents an example illustration of a time-series of related corpuses. Each unit of the horizontal axis (i.e., time axis "AXt") represents a unit of time "t," over which a corpus is collected. For each unit of time "t," the vertical axis (i.e., volume axis "AXv") represents the volume (or number) of statements collected. For example purposes only, in FIGS. 8A, 8B, 8D, 8E:

the scaling factor "v," for representing volume, is set at 16.5; and time unit "t" is set at 1 month.

FIG. 8A therefore shows seven months of volume data, with each month's volume represented in two ways:

1. the height of a month's rectangle (which, as measured on axis AXv, is multiplied by 16.5 to produce the actual number of statements it represents); and
2. a number, placed towards the top of a month's rectangle, that states the actual number of statements for that month.

Thus, for example, the volume for month t1 can be seen to be 66 statements. This is stated towards the top of the month's rectangle, or can be calculated from the height of the month's rectangle (shown as 4v, or 4 times the value of "v"). Since v is 16.5, 4v=4×16.5=66.

Figure 8B:
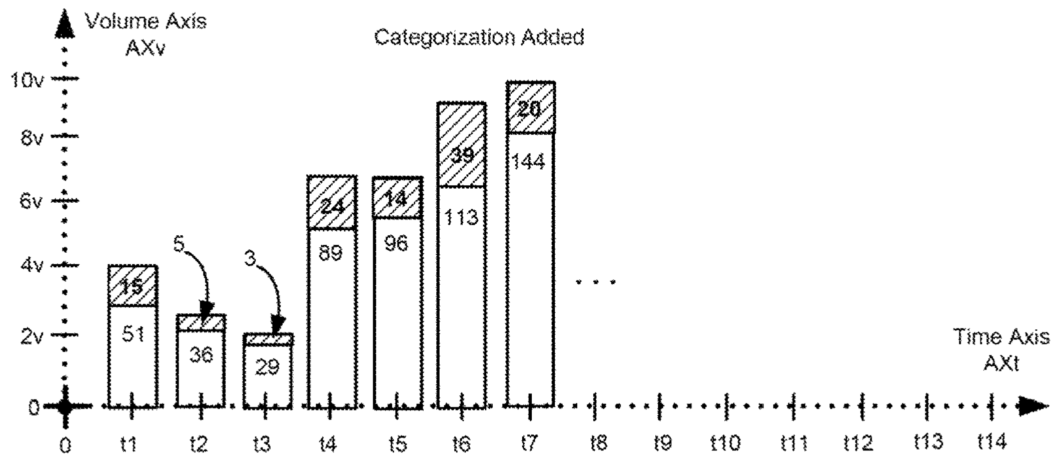
FIG. 8B is the same as FIG. 8A, except, for each unit of time, its corpus is subjected to a same categorization (e.g., polarity or intensity).

FIG. 8B is the same as FIG. 8A, except, for each unit of time:

its corpus is about a same object; and its corpus is subjected to a same categorization (e.g., polarity or intensity). FIG. 8B represents such categorization by dividing each rectangle, at a time "t," into cross-hatched and clear regions.

Figure 8C:
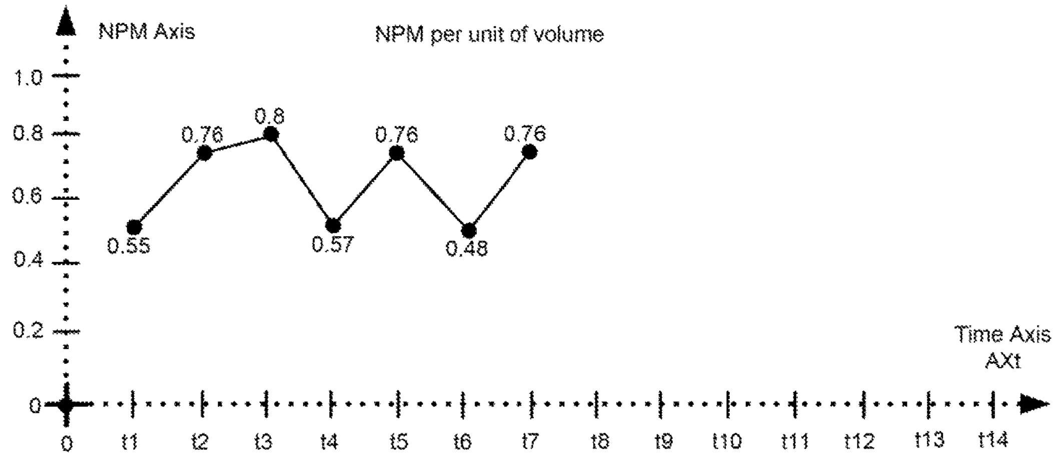
FIG. 8C shows how, for each unit of time "t," a categorization can be used to determine a value for the NPM metric.

Assuming cross-hatched is negative and clear is positive, FIG. 8C shows how, for each unit of time "t," the categorization can be used to determine an NPM value. A graph, such as FIG. 8C, can be useful for spotting trends (e.g., generally upward or generally downward) in a metric's value.

Figure 8D:
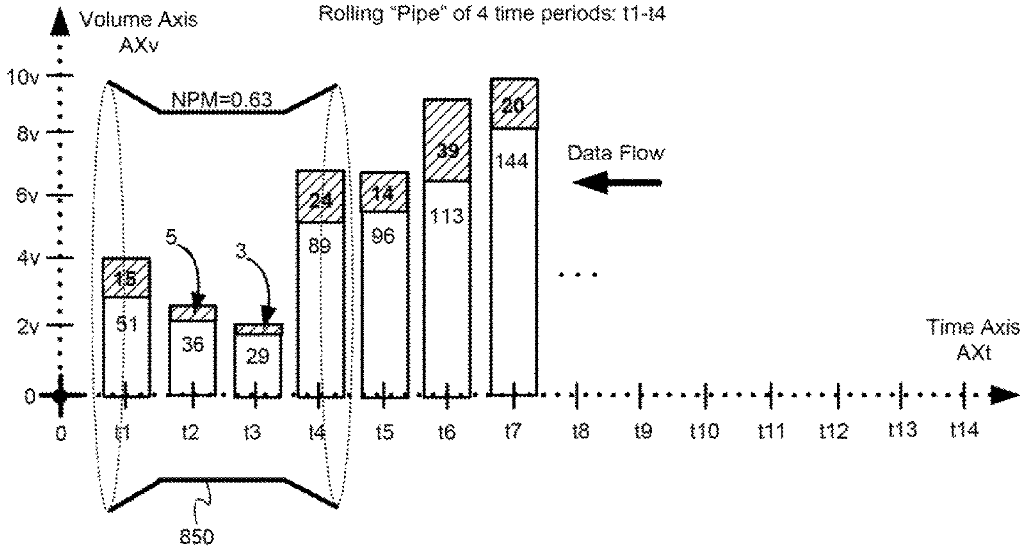
FIG. 8D shows a "pipe" or queue 850 that accepts, on a rolling basis, corpuses from a last four time units t1-t4.
Figure 8E:
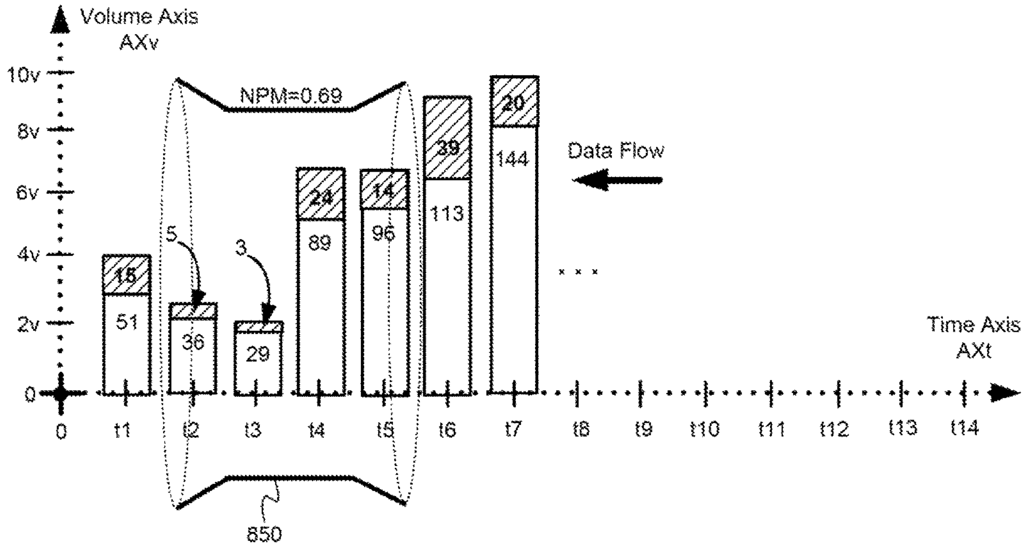
FIG. 8E shows a "pipe" or queue 850 that accepts, on a rolling basis, corpuses from a last four time units t2-t5.

Another use, for a time-series of related corpuses, is to maintain an updated sentiment analysis. This can be useful even if the sentiment analysis itself is not displayed with a temporal axis (as in the case of an IPS graph). FIGS. 8D and 8E, for example, show a "pipe" or queue 850 that accepts, on a rolling basis, corpuses from a last four time units. In FIG. 8D, as of a time t4, corpuses t1-t4 are used to compute a metric (in the example shown, NPM). As of time t5, shown in FIG. 8E, the contents of queue 850 has been updated to contain corpuses t2-t5. As can be seen from the example, NPM changes from 0.63 in FIG. 8D to 0.69 in FIG. 8E. The "smoothing" effect (i.e., greater stability), provided by application of a metric to a longer time period, can be seen by the fact that, in contrast to the 0.06 change in NPM, between FIGS. 8D-8E, the NPM's for t4 and t5 (respectively, 0.57 and 0.76) differ by 1.9.

Regardless of the time period used, such updates to metric values can be applied to the object-specific corpuses of an IPS graph. Any suitable timescale can be used, for updating the positions of the object-specific corpuses, dependent upon the particular application. For example, in the case of a typical consumer product brand "B1," a brand manager may wish to refer back to his or her IPS graph (showing B1 in relation to other competing brands of greatest interest) every few days. On the other hand, if an IPS graph is being used to depict the relative position of two candidates for political office, in "real time" during a political debate event, it may be necessary to update the metric values used every few minutes.

1.6 Correlation with Known Metrics

An empirical analysis has been performed, between values of NPM (as determined from well-known sources of Social Media, such as FACEBOOK) and conventionally-determined values from the American Consumer Satisfaction Index (ACSI).

In a first empirical analysis, NPM scores were determined for 12 retail businesses (all of which serve the U.S. market) on the basis of 12 months of Social Media data. For each of these businesses, its corresponding ACSI value was retrieved. An analysis was performed to compare these two sets of 12 data points: one set based on the NPM and the other from ACSI. In particular, the "Pearson Product-Moment Correlation Coefficient" (PPMCC) was determined. The PPMCC, also referred to as an "r" value, is widely used in the sciences as a measure of the strength of linear dependence between two variables. It ranges between +1 and −1 inclusive, with +1 meaning perfect correlation and 0 meaning no correlation. There was found to be a strong correlation between the two sets of 12 data points, with r=0.773. The data points, used in determining the PPMCC, are shown in the following table:

TABLE 1.4

| STORE | ACSI | NPM |
|---|---|---|
| Target Brands, Inc. | 78 | 51.3 |
| Kohl's Illinois, Inc. | 81 | 70.1 |
| J.C. Penney Company, Inc. | 80 | 65.3 |
| Sam's Club | 78 | 75.0 |
| Lowe's | 77 | 59.4 |
| Walgreens | 77 | 52.5 |
| Best Buy | 77 | 66.6 |
| Macy's | 76 | 66.2 |
| Home Depot | 75 | 58.0 |
| Rite Aid | 75 | 51.8 |
| CVS | 74 | 50.5 |
| Wal-Mart | 73 | 40.6 |

In a second empirical analysis, NPM scores were determined on the basis of a same 12 months of Social Media data, but across a wide range of industries. The industries studied included the following: automotive, airline, financial, Internet retail, Internet travel, Consumer Products & Goods (CPG), and grocery store. For each of these businesses, its corresponding ACSI value was retrieved. An analysis of the two sets of data points, one based on the NPM and the other from ACSI, showed strong correlation. In particular, the PPMCC was determined to be r=0.714.

1.7 Lack of Correlation Between Metrics

An empirical analysis has been performed, between values of NPM and NIM (as determined from well-known sources of Social Media, such as FACEBOOK). Specifically, for the same 12 retail businesses discussed above (Section 1.6 "Correlation With Known Metrics"), two sets of 12 values were produced: one set of NPM values and another set of NIM values. A correlation analysis, between the two sets of values, produced a very low PPMCC, with r=0.100. Thus, empirical evidence indicates that the polarity of a statement about an object is relatively independent of the intensity with which that polarity will be expressed (and intensity of a statement about an object is relatively independent of the polarity with which that intensity will be expressed). The study indicates that it is indeed valid to combine NPM and NIM as orthogonal axes, for purposes of creating an IPS graph.

Further, empirical evidence indicates that the volume of statements about an object is relatively independent of either the polarity or intensity of such statements. As discussed above, volume can be indicated in an IPS graph by the area of a circle, where the circle is representative of an object-specific corpus. A correlation analysis, between volume and polarity, for a collection of object-specific corpuses, found a very low PPMCC, with r=0.012.

1.8 SWOT-Type Analysis

As is well-known in the business management community, SWOT is an acronym for a strategic planning technique that seeks to identify, with respect to a company's competitive situation, its: Strengths, Weaknesses, Opportunities, and Threats (also known as "SWOT").

Regardless of how the quadrants of an IPS graph are identified (e.g., dividing along the middle of each axis, dividing along median lines, or dividing relative to a subset of a COS), such quadrants can be used to perform a "SWOT" type analysis with respect to an object's competitive situation.

The first step is to identify, for some object X1, a list of factors or characteristics, "L1," that can (or is expected to) effect X1's competitive situation. The list L1 can be identified by any suitable techniques.

As discussed above in Section 1.3 ("Sentiment Analysis"), an object-specific corpus P1, specific to some object X1, is produced by selecting for X1 in the Object_Role in an instanced corpus. A SWOT type analysis, for X1, can be accomplished by determining a subset of P1 for each member of L1. The subsets of P1 can be determined with any suitable technique, including the following. For each member "m" of L1, in addition to selecting each statement "s" where X1 appears in the Object_Role of its instance, it is further required that "m" appear in "s" within some predefined proximity of where X1 occurs in "s." Sufficient proximity, of "m" and X1 in a statement "s," can also be referred to as a co-occurrence. Each such subset of P1 can be called a "characteristic subset." If L1 has "n" members, then n characteristic subsets of P1 are produced.

To accomplish a SWOT type analysis, a collection of characteristic subsets (or a "CCS") can be placed on an IPS graph in essentially the same way as described above for a COS:

- NPM and NIM are determined for each characteristic subset;
- a dot or circle is plotted at the appropriate location; and
- the circle (or other 2D shape) has an area proportional to the number of statements in the characteristic subset it is representative of.

The quadrants of the resulting IPS graph can be related, as follows, to SWOT. In the following list, the object being subjected to SWOT analysis is assumed to be a brand (as discussed above in Section 1.4 "Brand Analysis"):

Net Positive-Strong: Strength

- i. A brand characteristic that generates strongly positive sentiment can be regarding as a core "strength" of that brand.
- ii. It can be regarded as a reason why existing customers stay and new customers might join.

Net Negative-Weak: Weakness

- i. A characteristic with negative sentiment, but only at a weak level, can be regarded as a "weakness."
- ii. While it may not presently be a reason for customers to leave a brand, there should be concern to (at least) prevent such negative feelings from becoming stronger.

Net Positive-Weak: Opportunity

- i. A characteristic that already has net positive sentiment, but at a weak level, can be regarded as an opportunity.
- ii. For example, there is an opportunity is to determine whether, and by what means (e.g., better messaging and/or further product improvement), the strength of the positive feelings can be increased.

Net Negative-Strong: Threat i. A characteristic with strongly negative sentiment is a threat, since it represents a clear and present reason why customers might leave the brand.

For example, consider a fictitious brand "STREAMER," that is a service for streaming movies over the Internet. Following is an example list of characteristics, determined by any suitable technique, for performing a SWOT analysis of STREAMER:

1. look and feel of STREAMER's web site
2. smartphone "app" for viewing the movies
3. ability to cancel, anytime, one's subscription to the STREAMER service
4. selection of movies available
5. price of subscription to the service
6. quality of STREAMER's customer service It will now be assumed that, for each of the six above-listed characteristics, a corresponding STREAMER subset (i.e., the subset of STREAMER's object-specific corpus that is produced when co-occurrence of a characteristic is also required) is represented by P1-P6 of FIG. 6C. Each of P1-P6 can then be described as follows:

Strengths:

Only P3 is in quadrant 621

Thus, a "Strength" of the STREAMER brand is the ability to cancel at any time

Weaknesses:

Only P4 is in quadrant 623

Thus, a "Weakness" of the STREAMER brand, that could become a threat to the brand if the net negative polarity gets stronger, is its limited selection of movies Opportunities:

P1 and P2 are in quadrant 620

Thus, characteristics of STREAMER, that have the "Opportunity" to become Strengths if intensity is improved further, are:

look and feel of STREAMER's web site smartphone "app" for viewing the movies

Threats:

P5 and P6 are in this quadrant 622.

Thus, "Threats" to the STREAMER brand are:

price of subscription quality of STREAMER's customer service

2 Additional Information 2.1 Word Lists

As discussed above with respect to Section 1.3, for purposes of categorizing the sentiment of a statement, the following four word lists can be used:

1. Positive Words: A list of words that convey or have a connotation with a positive sentiment. Since this list is compiled independent of the intensity of the positive sentiment, words on this list can range from being weakly positive (e.g., "nice") to strongly positive (e.g., "adore").
2. Negative Words: A list of words that convey or have a connotation with a negative sentiment. Since this list is compiled independent of the intensity of the negative sentiment, words on this list can range from being weakly negative (e.g., "deficient") to strongly negative (e.g., "hate").
3. Strong Words: A list of words that convey or have a connotation with a strong sentiment. Since this list is compiled independent of the polarity of the strong sentiment, words on this list can be either strongly negative (e.g., "hate") or strongly positive (e.g., "adore").
4. Weak Words: A list of words that convey or have a connotation with a weak sentiment. Since this list is compiled independent of the polarity of the weak sentiment, words on this list can be either weakly negative (e.g., "dislike") or weakly positive (e.g., "nice").

Since the above four lists are used for sentiment categorization, we can refer to them herein as the "categorization word lists." Rather than maintain the above-described categorization word lists, each of which contains words that overlap with those of another categorization word list, it can be more efficient to maintain the four below-listed lists. Since each of the below four lists corresponds to a quadrant, such as the quadrants of FIG. 4B, we can refer to them herein as the "quadrant word lists":

Positive-Weak: See example list in Section 2.1.1

Positive-Strong: See example list in Section 2.1.2

Negative-Strong: See example list in Section 2.1.3

Negative-Weak: See example list in Section 2.1.4

Figure 9:
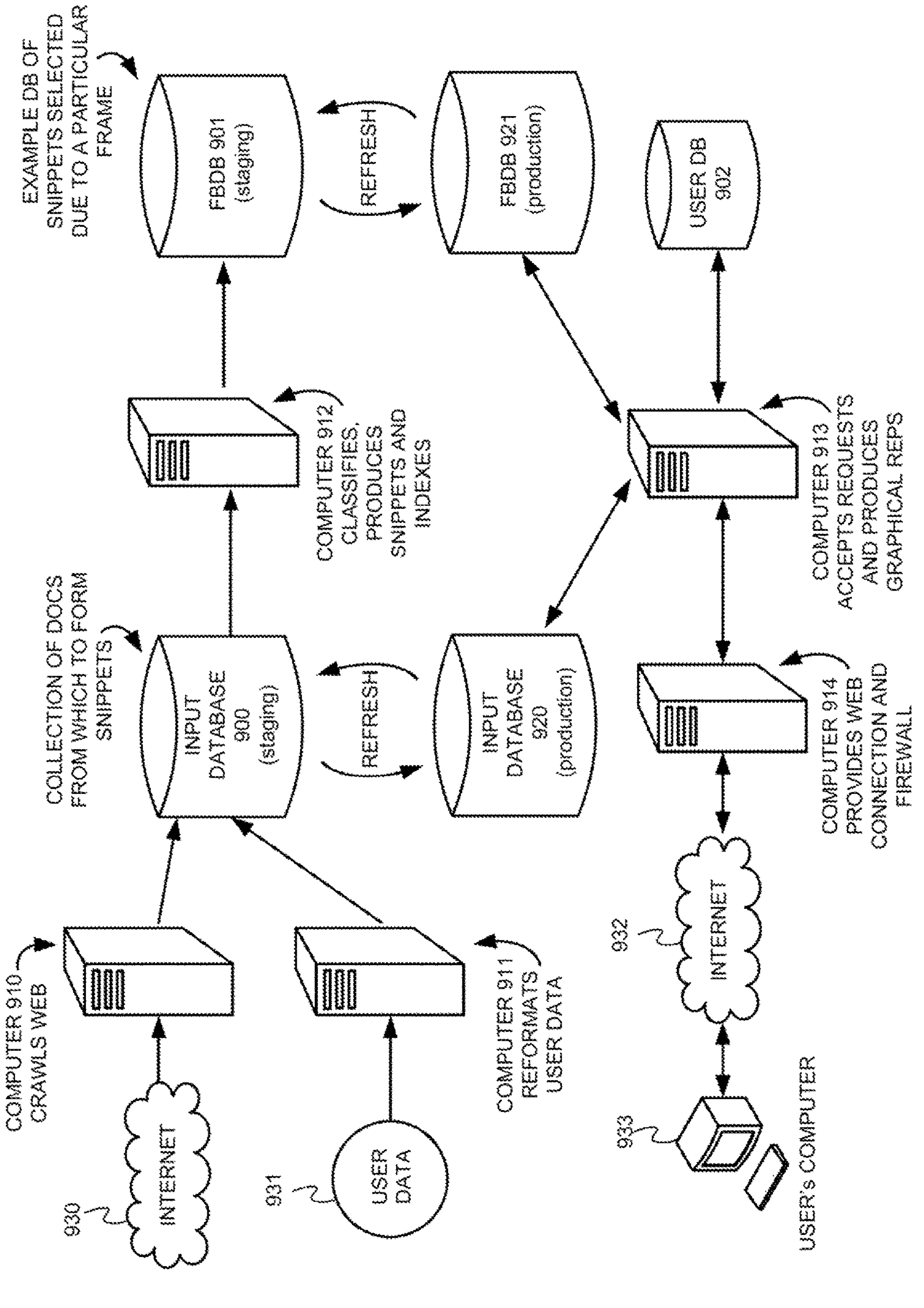
FIG. 9 depicts an example production-level computer system design in which the techniques described herein can be applied.

Each categorization word list can be created by the following unions of two of the quadrant word lists:

1. Positive Words: union of Positive-Strong and Positive-Weak
2. Negative Words: union of Negative-Strong and Negative-Weak
3. Strong Words: union of Positive-Strong and Negative-Strong
4. Weak Words: union of Positive-Weak and Negative-Weak 2.1.1 Example Quadrant Word List: Positive-Weak adequate, admirable, appreciate, appreciative, appropriate, attract, attractive, not bad, better, classy, comfortable, confidence, covet, cute, decent, desirable, desire, not disappoint, dope, elegant, enjoy, not evil, favor, favorable, fine, fond, fun, good, grateful, happy, hook, important, interest, interesting, not irritate, like, lovely, miss, neat, nice, not offend, pleasant, please, precious, prefer, preferable, pretty, no problem, satisfy, not stupid, thankful, treasure, trust, want, no weakness, no worry, not worse 2.1.2 Example Quadrant Word List: Positive-Strong adorable, adore, amaze, awesome, beautiful, best, brilliant, cool, crave, delight, excellent, exceptional, excite, exciting, fabulous, fan, fantastic, fave, favorite, first rate, gorgeous, great, ideal, impress, impressive, incredible, long for, love, luv, magnificent, outstanding, perfect, priceless, revolutionary, sexy, stun, super, superb, superior, terrific, thrill, top notch, vital, wonderful, world class 2.1.3 Example Quadrant Word List: Negative-Strong abhor, abysmal, anger, angry, awful, crap, crappy, despicable, despise, detest, disaster, disastrous, disgraceful, disgust, dreadful, eff, enrage, evil, fed up, fiasco, fuck, fucking, furious, garbage, hate, hatred, hideous, horrible, horrific, horrify, junk, loathe, nasty, not tolerate, offend, offensive, outrage, phucking, repulsive, rubbish, screw, shit, shitty, not stand, terrible, terrify, terrorize, trash, trashy, ugly, unacceptable, unbearable, useless, woefully, worst, worthless, yucky 2.1.4 Example Quadrant Word List: Negative-Weak not adequate, not advantageous, alarm, not amaze, annoy, not appreciate, not appropriate, not attractive, not awesome, bad, baffle, not beautiful, not beneficial, not best, not better, bewilder, blame, bore, bother, not brilliant, bug, not charming, not classy, not comfortable, not commendable, concern, not confidence, confuse, not cool, not crave, not craving, criticize, not cute, not decent, deficient, depress, not desire, detrimental, disappoint, disappointment, dislike, displease, dissatisfy, distrust, doubt, dread, dumb, not elegant, not enjoy, not enough, not essential, not excellent, not exceptional, not excite, not exciting, not fan, not fantastic, not favor, not favorite, fear, not fine, not flawless, not fond, foolish, not friend, frighten, frustrate, not fun, not good, not gorgeous, not great, not happy, not helpful, not ideal, imperfect, not important, not impress, not impressive, inferior, not interest, not interesting, intimidate, irk, irritate, joke, let down, not like, not love, not lovely, not luv, not magnificent, not need, not nice, not outstanding, not perfect, not pleasant, not please, poor, not prefer, not pretty, not priceless, problematic, regret, resent, not revolutionary, ridiculous, sadden, not satisfactory, not satisfy, scare, scorn, not sexy, sick, silly, skeptical, spook, stupid, not super, not superior, not sure, not terrific, not thrill, tire, not top notch, unattractive, unhappy, unimpressive, unpleasant, unsatisfactory, not valuable, not want, worry, worse, wrong 2.2 Computing Environment FIG. 9 depicts an example production-level computer system design in which the techniques described herein can be applied.

Cloud 930 represents data, such as online opinion data, available via the Internet. Computer 910 can execute a web crawling program, such as Heritrix, that finds appropriate web pages and collects them in an input database 900. An alternative, or additional, route for collecting input database 900 is to use user-supplied data 931. For example, such user-supplied data 931 can include the following: any non-volatile media (e.g., a hard drive, CD-ROM or DVD), record-oriented databases (relational or otherwise), an Intranet or a document repository. A computer 911 can be used to process (e.g., reformat) such user-supplied data 931 for input database 900.

Computer 912 can perform the indexing needed for formation of an appropriate frame-based database (FBDB). FBDB's are discussed above (Section 1.1 "Overview and Related Applications") and in the Related Applications. The indexing phase scans the input database for sentences that refer to an organizing frame (such as the "Sentiment" frame), produces a snippet around each such sentence and adds the snippet to the appropriate frame-based database. FIG. 9 depicts an example FBDB 901. For the example frame-based search systems described in Sections 1.1 and 1.2, an FBDB based on the "Sentiment" frame could be produced.

Databases 920 and 921 represent, respectively, stable "snapshots" of databases 900 and 901. Databases 920 and 921 can provide stable databases that are available for searching, about an object of interest in a first corpus, in response to queries entered by a user at computer 933. Such user queries can travel over the Internet (indicated by cloud 932) to a web interfacing computer 914 that can also run a firewall program. Computer 913 can receive the user query, collect snippet and frame instance data from the contents of the appropriate FBDB (e.g., FBDB 921), and transmit the results back to computer 933 for display to the user. The results from computer 913 can also be stored in a database 902 that is private to the individual user. When it is desired to see the snippets, on which a graphical representation is based, FBDB 921 is available. If it is further desired to see the full documents, on which snippets are based, input database 920 is also available to the user.

In accordance with what is ordinarily known by those in the art, computers 910, 911, 912, 913, 914 and 933 contain computing hardware, and programmable memories, of various types.

The information (such as data and/or instructions) stored on computer-readable media or programmable memories can be accessed through the use of computer-readable code devices embodied therein. A computer-readable code device can represent that portion of a device wherein a defined unit of information (such as a bit) is stored and/or read.

3 Glossary of Selected Terms

COS: collection of object-specific corpuses.

IPS graph: Intensity-Polarity Sentiment graph.

UNL: Refers to a "unit of natural language" in a corpus of human language. The term "UNL" can be used to refer to any unit of a natural language. For example, a UNL can refer to a unit that is of arbitrary length or that is not associated with any general linguistic structure. However, the UNL focused upon herein is the single sentence or clause.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for graphically characterizing statements about an object, comprising:

applying, as a result of computing hardware and programmable memory, frame extraction, to a first corpus, in order to attempt to identify, for each statement of the corpus, an object and a sentiment expressed about the object;

identifying, as a result of computing hardware and programmable memory, a first object-specific corpus, that is a subset of the first corpus, where all the statements of the first object-specific corpus are about a same first object;

categorizing, as a result of computing hardware and programmable memory, a sentiment of each statement, of the first object-specific corpus;

determining, as a result of computing hardware and programmable memory, a net metric as a function of the categorization; and producing, as a result of computing hardware and programmable memory, a first graphical representation, of the first object-specific corpus, that is placed, relative to a first axis, according to the net metric.

2. The method of claim 1, wherein the categorizing further comprises:

categorizing a polarity of each statement, of the first object-specific corpus.

3. The method of claim 2, wherein the categorizing further comprises:

categorizing an intensity of each statement, of the first object-specific corpus.

4. The method of claim 3, wherein the step of determining a net metric further comprises:

determining a net polarity measure, as a function of the polarity categorization; and determining a net intensity measure, as a function of the intensity categorization.

5. The method of claim 4, wherein the step of producing a first graphical representation further comprises:

placing the first graphical representation, relative to the first axis, in accordance with the net polarity measure; and placing the first graphical representation, relative to a second axis, in accordance with the net intensity measure.

6. The method of claim 1, wherein the step of producing a first graphical representation further comprises:

producing a graphical representation having an area proportional to a number of statements contained in the first object-specific corpus.

7. The method of claim 3, wherein the categorizing further comprises:

categorizing the polarity as either positive or negative; and categorizing the intensity as either strong or weak.

8. The method of claim 5, further comprising:

production of a first and a second dividing line, each dividing line parallel to, respectively, the first axis and the second axis.

9. The method of claim 8, wherein production, of the first and second dividing lines, further comprises:

placing the first and second dividing lines in order to divide the area, for placement of the first graphical representation of the first object-specific corpus, into quadrants.

10. The method of claim 1, further comprising:

applying frame extraction, to a second corpus, in order to attempt to identify, for each statement of the corpus, an object and a sentiment expressed about the object;

identifying a first plurality of object-specific corpuses, each of which is a subset of the second corpus, where all the statements, of an object-specific corpus, are about a same object;

categorizing a sentiment of each statement of each object-specific corpus of the first plurality of object-specific corpuses;

determining a net metric, for each object-specific corpus of the first plurality of object-specific corpuses, as a function of the categorization; and determining a first median net metric measure, from the net metrics of the first plurality of object-specific corpuses; and placing a first median dividing line, perpendicular to the first axis, located at, approximately, the first median net metric measure.

11. The method of claim 8, further comprising:

applying frame extraction, to a second corpus, in order to attempt to identify, for each statement of the corpus, an object and a sentiment expressed about the object;

identifying a first plurality of object-specific corpuses, each of which is a subset of the second corpus, where all the statements, of an object-specific corpus, are about a same object;

categorizing a polarity and intensity of each statement of each object-specific corpus;

determining a net polarity measure and a net intensity measure, for each object- specific corpus, as a function of the categorization; and determining a median net polarity measure, from the net polarity measures;

determining a median net intensity measure, from the net intensity measures; and placing each of the first and second dividing lines, respectively, at a location that approximately intersects the median net intensity and median net polarity measures.

12. The method of claim 8, further comprising:

identifying a first plurality of object-specific corpuses, each of which is a subset of the first corpus, where all the statements, of an object-specific corpus, are about a same object;

categorizing the polarity and intensity of each statement of each object-specific corpus;

determining a net polarity measure and a net intensity measure, for each object- specific corpus, as a function of the categorization;

selecting a first subset of the first plurality of object-specific corpuses;

placing the first and second dividing lines in order to divide an area, relative to the first subset, into quadrants for placement of a graphical representation for each member of the first subset.

13. The method of claim 1, wherein the first object represents a brand.

14. The method of claim 12, wherein each object, for each of the first plurality of object-specific corpuses, represents a different brand but all the brands are part of a same category of brand.

15. The method of claim 1, further comprising:

producing a second corpus, containing statements within a second temporal range that is different from a first temporal range of the statements of the first corpus;

applying frame extraction, to the second corpus, in order to attempt to identify, for each statement of the corpus, an object and a sentiment expressed about the object;

identifying a second object-specific corpus, that is a subset of the second corpus, where all the statements of the second object-specific corpus are about the same first object as the first object-specific corpus;

categorizing the sentiment of each statement, of the second object-specific corpus;

determining a second net metric value as a function of the categorization of the second object-specific corpus; and producing a second graphical representation, of the second object-specific corpus, that is placed, relative to the first axis, according to the second net metric.

16. The method of claim 15, wherein the second temporal range is disjoint from the first temporal range.

17. The method of claim 15, wherein a beginning and ending time, of the first and second temporal ranges, are the same.

18. The method of claim 15, wherein producing a second graphical representation further comprises:

updating a position of the first graphical representation.

19. The method of claim 15, wherein producing a second graphical representation further comprises:

producing a graphical representation additional to the first graphical representation.

20. The method of claim 15, wherein producing a second graphical representation further comprises:

placing the second graphical representation relative to a second temporal axis, with the first graphical representation occupying a differing position relative to the second temporal axis.

21. The method of claim 1, further comprising:

categorizing the polarity of each statement, of the first object-specific corpus, wherein the first object-specific corpus contains mostly statements from social media; and determining a net polarity measure, as a function of the polarity categorization, wherein the net polarity measure has a strong correlation with a survey-based technique for determining sentiment.

22. The method of claim 21, wherein the survey- based technique is the American Consumer Satisfaction Index.

23. The method of claim 21, wherein the strong correlation corresponds to a value of 0.7 or greater, for a correlation coefficient.

24. The method of claim 4, wherein the net polarity and intensity measures have a very low correlation.

25. The method of claim 24, wherein the very low correlation corresponds to a value of 0.1 or less, for a correlation coefficient.

26. The method of claim 1, further comprising:

categorizing the polarity of each statement, of the first object-specific corpus; and determining a net polarity measure of the first object-specific corpus, as a function of the polarity categorization, wherein the net polarity measure has a very low correlation to a number of statements contained in the first object-specific corpus.

27. The method of claim 26, wherein the very low correlation corresponds to a value of 0.1 or less, for a correlation coefficient.

28. The method of claim 5, further comprising:

identifying a first plurality of object-specific corpuses, each of which is a subset of the first corpus, where all the statements, of an object-specific corpus, are about a same object and the first object-specific corpus is part of the first plurality of object-specific corpuses;

categorizing the polarity and intensity of each statement of each object-specific corpus;

determining a net polarity measure and a net intensity measure, for each object- specific corpus, as a function of the categorization;

determining a total number of statements across the first plurality of object- specific corpuses;

producing a first relative value, of a first number of statements contained in the first object-specific corpus considered relative to the total number of statements;

producing the first graphical representation of the first object-specific corpus with an area proportional to the first relative value.

29. The method of claim 28, wherein the first relative value has a very low correlation to the net polarity measure.

30. The method of claim 29, wherein the very low correlation corresponds to a value of 0.1 or less, for a correlation coefficient.

31. The method of claim 1, further comprising:

identifying a first plurality of object-specific corpuses, including the first object- specific corpus, where each object-specific corpus is a subset of the first corpus;

limiting each corpus, of the first plurality of object-specific corpuses, such that all statements are about a same object and a same characteristic of the same object;

categorizing the polarity and intensity of each statement of each object-specific corpus;

determining a net polarity measure and a net intensity measure, for each object- specific corpus, as a function of the categorization;

placing a graphical representation, of each corpus of the first plurality of object- specific corpuses, relative to first and second axes, in accordance with, respectively, the net polarity and intensity measures;

dividing a graphing space, defined by the axes, into quadrants;

mapping each quadrant to representing one of strengths, weaknesses, opportunities and threats.

32. The method of claim 11, wherein the second corpus is the same as the first corpus and the first object-specific corpus is a member of the first plurality of object-specific corpuses.

33. The method of claim 1, further comprising:

producing a first Logical Form semantic representation for a first statement of the first corpus;

determining whether a first frame extraction rule matches the first Logical Form;

producing, if the first frame extraction rule matches, a first instance having at least object and sentiment roles, with values of the first Logical Form assigned to corresponding roles of the first instance; and including the first instance as part of the identifying of the first object-specific corpus.

* * * * *